US012679123B2

(12) United States Patent
Hitosugi et al.

(10) Patent No.: US 12,679,123 B2
(45) Date of Patent: Jul. 14, 2026

(54) PRINTING APPARATUS, PRINTING SYSTEM, PRINTING METHOD, AND NON-TRANSITORY RECORDING MEDIUM

(71) Applicants: Jun Hitosugi, Tokyo (JP); Masayuki Tsuchiya, Tokyo (JP); Yoshihito Tsuboi, Kanagawa (JP); Kenji Ishii, Kanagawa (JP)

(72) Inventors: Jun Hitosugi, Tokyo (JP); Masayuki Tsuchiya, Tokyo (JP); Yoshihito Tsuboi, Kanagawa (JP); Kenji Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/460,013

(22) Filed: Sep. 1, 2023

(65) Prior Publication Data

US 2024/0165978 A1 May 23, 2024

(30) Foreign Application Priority Data

Nov. 22, 2022 (JP) ................................ 2022-186567

(51) Int. Cl.
*B41J 29/19* (2006.01)

(52) U.S. Cl.
CPC .................................... *B41J 29/19* (2013.01)

(58) Field of Classification Search
CPC ........................................................ B41J 29/19
See application file for complete search history.

(56) References Cited

U.S. PATENT DOCUMENTS

| | | | | | |
|---|---|---|---|---|---|
| 4,204,012 | A * | 5/1980 | Brocklehurst | D06H 1/00 | 118/42 |
| 11,738,579 | B2 * | 8/2023 | Vogt | B65H 23/048 | 347/264 |
| 2006/0244935 | A1 * | 11/2006 | Overbeck | G01J 3/50 | 355/38 |
| 2012/0163842 | A1 * | 6/2012 | Murayama | G03G 15/0194 | 399/49 |
| 2015/0090140 | A1 * | 4/2015 | Rancourt | B41F 33/0081 | 101/484 |
| 2016/0139537 | A1 | 5/2016 | Kasai et al. | | |
| 2016/0147174 | A1 | 5/2016 | Yasuda et al. | | |
| 2016/0170321 | A1 | 6/2016 | Komori et al. | | |
| 2016/0313668 | A1 | 10/2016 | Kasai et al. | | |
| 2016/0357138 | A1 * | 12/2016 | Nakamura | G03G 15/6502 | |
| 2016/0374567 | A1 * | 12/2016 | Breslow | A61B 5/02405 | 600/301 |
| 2017/0199480 | A1 | 7/2017 | Morinaga et al. | | |
| 2018/0314182 | A1 * | 11/2018 | Wada | H04N 23/80 | |

(Continued)

FOREIGN PATENT DOCUMENTS

| | | |
|---|---|---|
| JP | 2020-029098 A | 2/2020 |
| WO | 2020/158725 A1 | 8/2020 |

OTHER PUBLICATIONS

Kimura, 2020158725 Machine Translation (Year: 2020).*

*Primary Examiner* — David H Banh
(74) *Attorney, Agent, or Firm* — IPUSA, PLLC

(57) ABSTRACT

A printing apparatus includes a print execution device and an illumination device. The print execution device includes a plurality of heads to print an image on a print medium based on print data. The illumination device irradiates the printed image on the print medium with illumination light from behind a printed face of the print medium.

10 Claims, 17 Drawing Sheets

(56) References Cited

U.S. PATENT DOCUMENTS

| | | | | |
|---|---|---|---|---|
| 2021/0405157 | A1* | 12/2021 | Gassend | G01S 7/4972 |
| 2022/0183618 | A1* | 6/2022 | Capodilupo | A61B 5/4809 |
| 2022/0250396 | A1* | 8/2022 | Kishida | B41J 2/165 |
| 2023/0132779 | A1* | 5/2023 | Gretsch | B41F 33/0018<br>101/484 |
| 2023/0301552 | A1* | 9/2023 | Mallires | A61B 5/165 |

* cited by examiner

| | | COLOR | | | | |
|---|---|---|---|---|---|---|
| | | DAYLIGHT/ OVERCAST [6500k] | DAYLIGHT/ COOL WHITE [5000k] | WHITE [4200k] | WARM WHITE [3500k] | ··· |
| MEDIUM TO USE | FOR ILLUMINATION SIGNBOARD [TRANSMITTANCE: HIGH] | 4000 lx | 3000 lx | 2000 lx | 1000 lx | ··· |
| | FOR RAILWAY FACILITY [TRANSMITTANCE: MIDDLE] | 4500 lx | 3500 lx | 2500 lx | 1500 lx | ··· |
| | FOR SPACE LIGHTING [TRANSMITTANCE: LOW] | 5000 lx | 4000 lx | 3000 lx | 2000 lx | ··· |
| | ··· | ··· | ··· | ··· | ··· | ··· |

FIG. 17

| | | TIME OF DAY | | | |
|---|---|---|---|---|---|
| | | MORNING | DAYTIME | EVENING | NIGHT |
| PLACE | OPEN SPACE | ±0 × 100% | −1000 × 50% | −1500 × 90% | −2500 × 70% |
| | STORE | ±0 × 100% | −1000 × 50% | −1500 × 70% | −2500 × 50% |
| | OUTSIDE | ±0 × 100% | −1000 × 50% | −1500 × 50% | −2500 × 30% |

FIG. 18

| | | EVENT TYPE | | | |
|---|---|---|---|---|---|
| | | LIVELINESS | CALM | NORMAL | SALE |
| PLACE | OPEN SPACE | ±0 × 100% | −2000 × 70% | N/A | N/A |
| | STORE | N/A | N/A | −2000 × 60% | ±0 × 50% |
| | OUTSIDE | N/A | N/A | N/A | N/A |

FIG. 19

| | | PRODUCT TYPE | | | |
|---|---|---|---|---|---|
| | | SUMMER GOODS (COLD COLOR SYSTEM) | WINTER GOODS (WARM COLOR SYSTEM) | KITCHEN (CLEAN) | GIFTS (CHIC) |
| PLACE | OPEN SPACE | ±0 × 100% | −2000 × 100% | N/A | N/A |
| | STORE | N/A | N/A | ±0 × 100% | −2000 × 80% |
| | OUTSIDE | N/A | N/A | N/A | N/A |

PRINTING APPARATUS, PRINTING SYSTEM, PRINTING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2022-186567, filed on Nov. 22, 2022, in the Japan Patent Office, the entire disclosure of which is hereby incorporated by reference herein.

BACKGROUND

Technical Field

Embodiments of the present disclosure relate to a printing apparatus, a printing system, a printing method, and a non-transitory recording medium.

Related Art

As known in the art, illumination advertisement media (also referred to as internally illuminated signboards) such as illumination panels and illumination stands have been used in downtown areas and various facilities such as commercial facilities (for example, restaurants, retail stores, department stores, and shopping malls), amusement facilities, railway stations, and public facilities. The illumination advertisement medium is an advertisement medium of which the visibility is enhanced by illuminating a printed matter, such as a resin sheet on the surface of the advertisement medium, from behind a printed face of the printed matter with an illumination device disposed inside the advertisement medium.

The appearance of the illumination advertisement medium changes depending on the internal illumination light and the surrounding environmental conditions. For this reason, in a printing factory for producing printed matter that is used for illumination advertisement media, the print quality is checked while manually applying illumination light to a printed print medium output from a printing apparatus.

SUMMARY

According to an embodiment of the present disclosure, a printing apparatus includes a print execution device and an illumination device. The print execution device includes a plurality of heads to print an image on a print medium based on print data. The illumination device irradiates the printed image on the print medium with illumination light from behind a printed face of the print medium.

According to an embodiment of the present disclosure, a printing system includes the printing apparatus and a user terminal operable by a user and communicably connected to the printing apparatus through a network. The user terminal includes circuitry that transmits a print job to the printing apparatus. The print job includes the print data of the image to be printed by the printing apparatus.

According to an embodiment of the present disclosure, a printing method performed by a printing apparatus includes printing an image on a print medium based on print data and irradiating the printed image on the print medium with illumination light from behind a printed face of the print medium.

According to an embodiment of the present disclosure, a non-transitory recording medium storing a plurality of instructions which, when executed by one or more processors of a printing apparatus, causes the one or more processors to perform a printing method. The method includes determining an irradiation condition of illumination light based on attribute information of a print medium, printing an image on the print medium based on print data, and irradiating the printed image on the print medium with the illumination light from behind a printed face of the print medium, based on the determined irradiation condition.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 17 is a diagram illustrating a first example of a usage condition table according to the first embodiment of the present disclosure;

FIG. 18 is a diagram illustrating a second example of the usage condition table according to the first embodiment of the present disclosure;

FIG. 19 is a diagram illustrating a third example of the usage condition table according to the first embodiment of the present disclosure;

Figure 1:
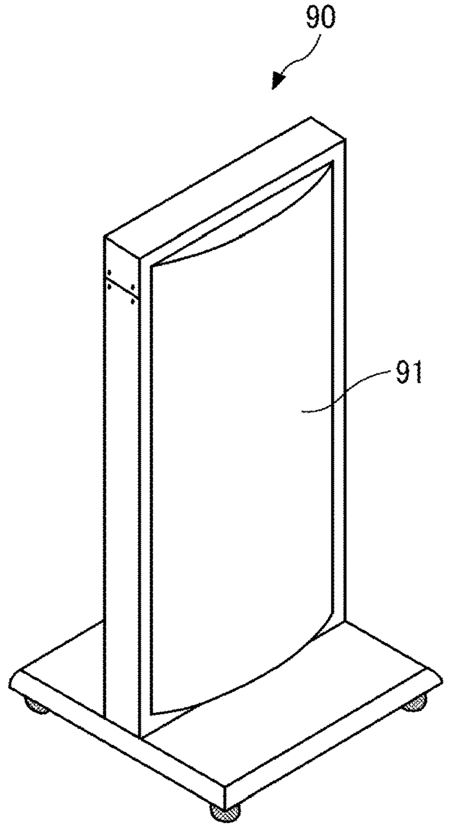
FIG. 1 is a schematic diagram illustrating a first example of an illumination advertisement medium according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described below.

As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

In the following description, suffixes Y, M, C, and K denote colors of yellow, magenta, cyan, and black, respectively. To simplify the description, these suffixes are omitted unless necessary.

As used herein, the term "connected/coupled" includes both direct connections and connections in which there are one or more intermediate connecting elements.

A description is given below of a first embodiment of the present disclosure.

According to an embodiment of the present disclosure, a printing system is used in a facility for performing printing on various print media, such as a printing factory. In the printing factory according to the present embodiment, printed matter is produced to be used for illumination signboards (illumination advertisement media) such as illumination panels and illumination stands.

<Outline of Illumination Advertisement Media>

Figure 2:
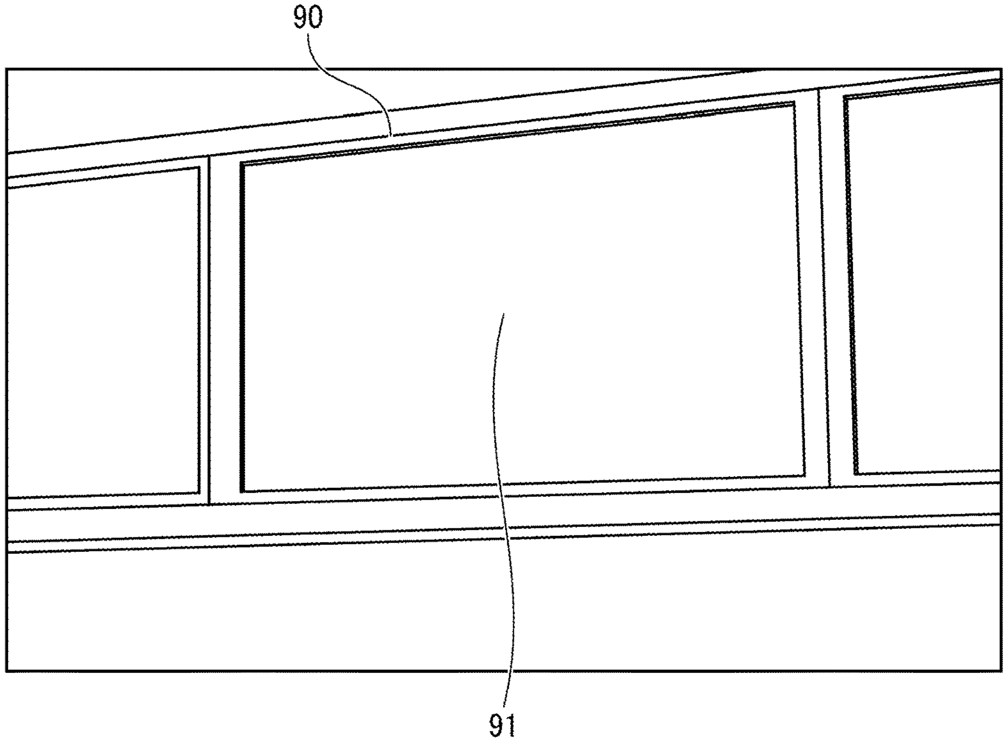
FIG. 2 is a schematic diagram illustrating a second example of the illumination advertisement medium according to the above embodiment.
Figure 3:
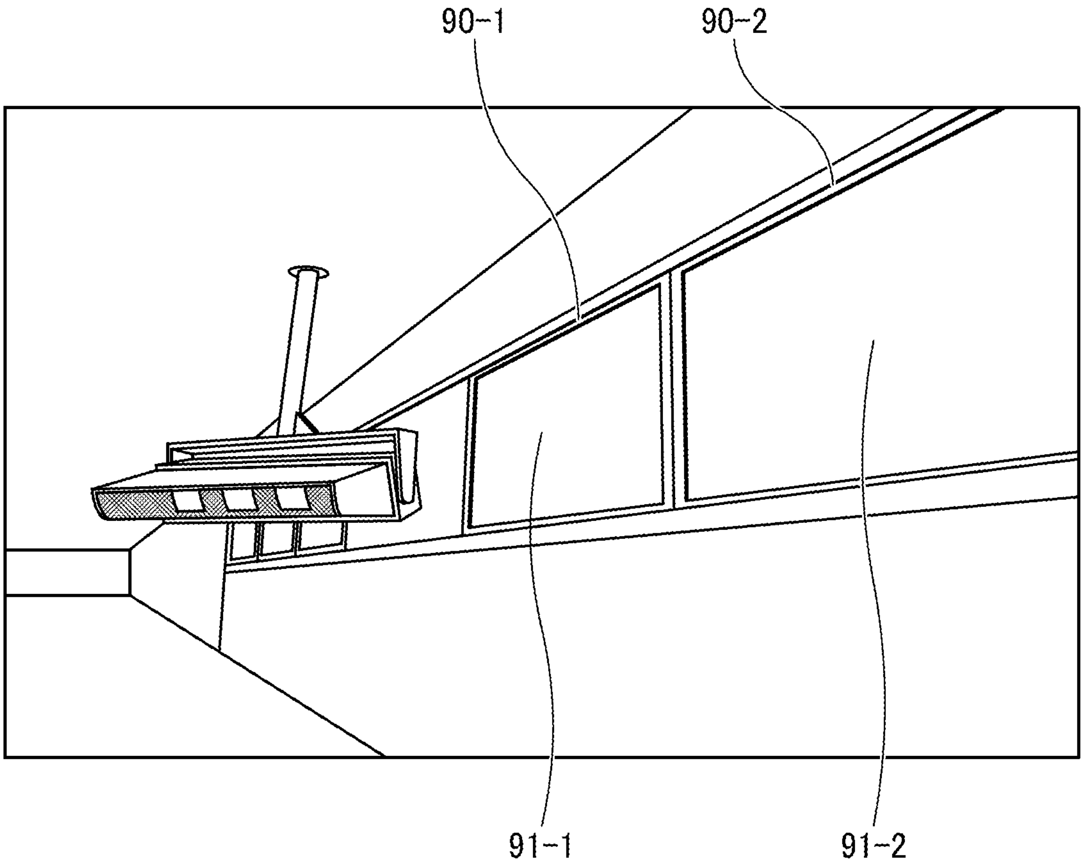
FIG. 3 is a schematic diagram illustrating a third example of the illumination advertisement medium according to the above embodiment.

Referring to FIGS. 1 to 3, a description is given below of illumination advertisement media according to the present embodiment.

FIGS. 1, 2, and 3 are schematic diagrams respectively illustrating first to third examples of illumination advertisement media according to the present embodiment.

The first example of the illumination advertisement media is a store signboard, which may be also called an illumination stand. As illustrated in FIG. 1, an illumination advertisement medium 90 in the first example includes a signboard portion 91 on a side face visible from the outside. The signboard portion 91 is made of a material having transparency such as resin.

An image in which, for example, characters, figures, and photographs are laid out is formed on the signboard portion 91. A light source such as a light emitting diode (LED) is disposed inside the illumination advertisement medium 90. When irradiated with illumination light from the light source, the image formed on the signboard portion 91 is visually recognized from the outside.

To form an image on the signboard portion 91, for example, an image may be directly printed on a panel made of resin, which serves as the signboard portion 91. Alternatively, an image may be printed on a sheet-like print medium having transparency and the print medium may be brought into close contact with a panel, which serves as the signboard portion 91.

Although FIG. 1 illustrates the store signboard, which may be also called an illumination stand, as the first example of the illumination advertisement media, the illumination advertisement media according to the present embodiment is not limited to the store signboard. For example, the illustration advertisement medium may be an illumination panel that is posted in a railway facility or a retail store.

The second example of the illumination advertisement media is an illumination panel that is posted in a commercial facility. As illustrated in FIG. 2, the illumination advertisement medium 90 in the second example is fixed to a wall surface of a commercial facility. The illumination advertisement medium 90 includes the signboard portion 91 on a surface that can be visually recognized by, for example, customers coming and going in the commercial facility. The illumination panel includes a panel made of, for example, resin. The panel is openable and closable with a frame made of, for example, aluminum. A light source such as an LED is disposed on a wall-side face of the panel. In commercial facilities, advertisement contents are frequently changed depending on, for example, seasons and events such as sales. The illumination panels that are posted in commercial facilities have a configuration that facilitates changes of the advertisement contents. Specifically, a printed matter bearing an image representing the advertisement content adheres to the inner side of the illumination panel.

The third example of the illumination advertisement media is an illumination panel that is posted in a railway facility. As illustrated in FIG. 3, illumination advertisement media 90-1 and 90-2 in the third example are fixed to a wall surface of, for example, a platform of a railway station. The illumination advertisement media 90-1 and 90-2 respectively include signboard portions 91-1 and 91-2 on the surfaces that can be visually recognized by, for example, passengers coming and going in the railway station. Many advertisements of companies or commercial facilities along the railway are posted in railway facilities. The advertisement contents are often changed depending on the situations of advertisers. For this reason, the illumination panels that are posted in the railway facilities have a configuration that facilitates changes of the advertisement contents, like the illumination panels that are posted in commercial facilities.

Since illumination advertisement media are used in various environments, the illumination light is adjusted to suit the use for the illumination advertisement media. For example, visibility is important for store signboards to be confirmed from a distance even at night. For this reason, light sources having a relatively high amount of light are often used for the store signboards.

For example, railway facilities emphasize the safety and visual workability of passengers or crew members. For this reason, as light sources of the illumination advertisement media that are posted in railway facilities, for example, LEDs, metal halide lamps, high color rendering metal halide lamps, electrodeless fluorescent lamps, or fluorescent lamps are often used with an emphasis on color rendering properties. For use with an emphasis on efficiency and life, such as for garages, for example, LEDs or electrodeless fluorescent lamps are preferably used. Since illumination panels suitable for use are utilized in various usage scenes in railway facilities, light sources of the illumination panels are also adjusted to have a color temperature and an amount of light suitable for the usage scene.

For example, in some commercial facilities, space lighting may be optimized based on the time of day or seasons. For example, clear illumination may be provided in the morning to produce a fresh atmosphere. A relatively high color temperature may be set in the active period in the evening to produce a crowd, whereas a relatively low color temperature may be set in the daytime and nighttime. A cool atmosphere may be produced in a cold color system in summer, whereas a warm atmosphere may be produced in a warm color system in winter. In commercial facilities, the color temperature and the amount of light of the light sources of the illumination panels are adjusted as appropriate for spatial production.

<Checking Quality of Printed Matter Used for Illumination Advertisement Media>

In printing factories for producing printed matter that is used for illumination advertisement media, the quality of images formed on printed print media is checked after the printed matter is output. For example, it is checked whether the images are defective with streaks or unevenness or whether the color of the images is as intended. When the image quality is found poor as a result of the quality checking, the print medium bearing the defective image is discarded. After the quality checking, the print setting is adjusted and the printing is performed again. If, for example, the print quality is found poor at an earlier stage in the process of outputting a printed matter, the cost of ink, print media, and the man-hour required for reprinting may be reduced.

It is difficult to check the print quality of printed matter that is used for illumination advertisement media while considering the usage environment. The illumination advertisement medium is visually recognized from the outside when a printed print medium on the surface of the illumination advertisement medium is irradiated with illumination light from a light source disposed inside the illumination advertisement medium. For this reason, the printed matter that is used for the illumination advertisement media is often produced at a relatively high print density so as not to be whitened by the illumination light. When the print density is relatively high, it is difficult to find abnormalities such as streaks or unevenness under natural light. In consideration of the usage environment of the illumination advertisement medium, the print quality is to be checked on a printed face of the print medium while the print medium is irradiated with illumination light from behind the printed face of the print medium.

On the other hand, printing apparatuses for producing printed matter that is used for illumination advertisement media have a structure in which a printed print medium is wound in a roll shape. For this reason, in typical printing factories, after a printed print medium is output and removed from a printing apparatus, the appearance such as colors and the density of the printed print medium is checked while the printed print medium is manually irradiated with the illumination light.

Such a way of checking the quality of printed matter in typical printing factories is troublesome and inefficient. When the print quality is checked after the printing is completed and if the print quality is found poor, the print setting such as the print density is to be adjusted and the printing is to be executed again.

The color temperature and the amount of light of the light source vary between the illumination advertisement media. For example, the appearance of the illumination advertisement media varies depending on, for example, the location (indoor or outdoor), the seasons, or the time of day when the illumination advertisement media are used.

In addition, for example, the appearance of the illumination advertisement media may be desired to be changed in consideration of a comprehensive production of a space in which the illumination advertisement media are disposed. For this reason, the print quality of the printed matter that is used for the illumination advertisement media is to be checked based on, for example, the specification and the environment in which the illumination advertisement media are disposed.

An embodiment of the present disclosure addresses such drawbacks in the process of checking the print quality of a printed matter that is used for, for example, an illumination advertisement medium. A printing apparatus according to an embodiment of the present disclosure irradiates a printed print medium (specifically, a printed image on a print medium), which is output from the printing apparatus, with illumination light from behind a printed face of the print medium. Thus, an operator of the printing apparatus can check the print quality of the printed print medium while executing printing. A printing apparatus according to an embodiment of the present disclosure irradiates a printed print medium with illumination light suitable for the usage environment. In other words, an operator of the printing apparatus can check the appearance of, for example, an illumination advertisement medium in the usage environment. Accordingly, the operator can check the print quality with high accuracy, according to the usage environment.

Figure 4A:
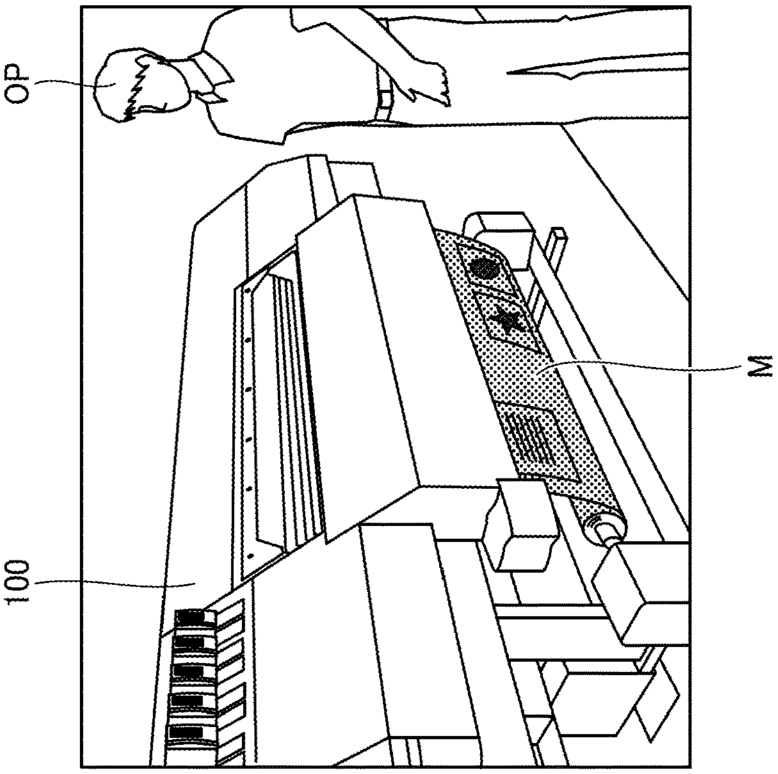
FIGS. 4A and 4B are diagrams each illustrating a quality-checking operation.
Figure 4B:
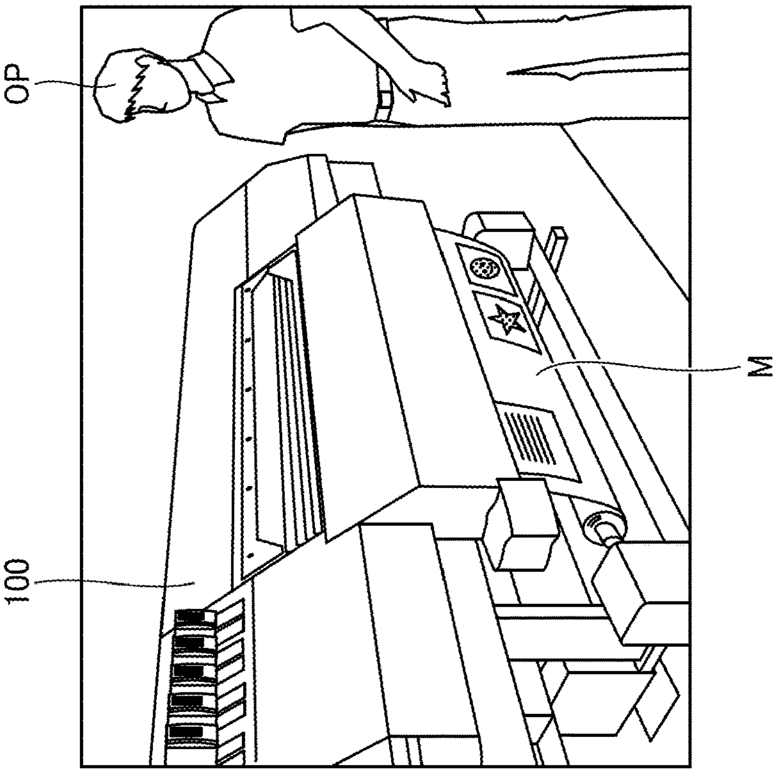

FIGS. 4A and 4B are diagrams each illustrating a quality-checking operation.

Specifically, FIG. 4A is a diagram illustrating a quality-checking operation with the printing apparatus 100 not emitting illumination light. FIG. 4B is a diagram illustrating a quality-checking operation with the printing apparatus 100 emitting illumination light.

As illustrated in FIGS. 4A and 4B, a printing apparatus 100 for producing printed matter that is used for, for example, illumination advertisement media has a structure in which a printed print medium M is output from a lower front of the printing apparatus 100 and is wound in a roll shape. An operator OP who operates the printing apparatus 100 often works while standing in front of the printing apparatus 100. Since the printed matter that is used for the illumination advertisement media has a high print density, the entire printed matter looks black when not irradiated with illumination light as illustrated in FIG. 4A. Thus, it is hard to determine the print quality.

As illustrated in FIG. 4B, when the illumination light is emitted from behind the printed face of the print medium M, which is from behind the print medium M when viewed by the operator OP standing in front of the printing apparatus 100, the operator OP can easily check how the print medium M to be output from the printing apparatus 100 looks when the print medium M is used for, for example, an illumination advertisement medium. Since a control panel is disposed at the front of the printing apparatus 100, the operator OP can immediately operate the control panel to stop the printing when the operator OP finds that the print quality is poor.

<Overall Configuration of Printing System>

Figure 5:
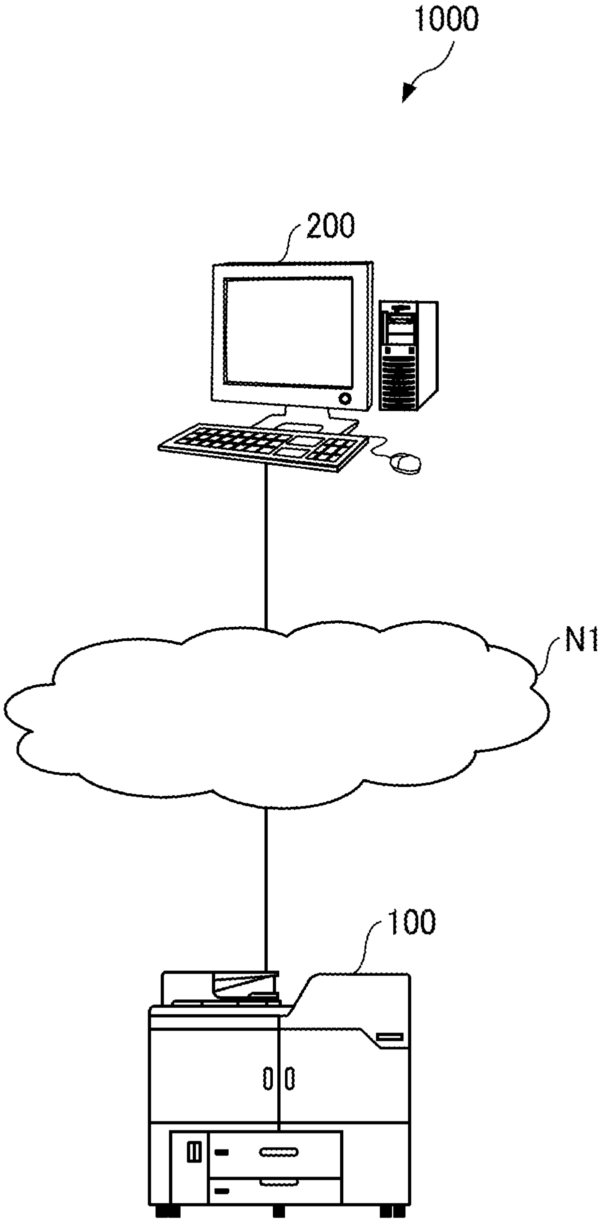
FIG. 5 is an illustration of the overall configuration of a printing system according to an embodiment of the present disclosure.

Referring to FIG. 5, a description is given below of the overall configuration of a printing system 1000 according to the present embodiment.

FIG. 5 is an illustration of the overall configuration of the printing system 1000 according to the present embodiment.

As illustrated in FIG. 5, the printing system 1000 according to the present embodiment includes the printing apparatus 100 and a user terminal 200. Each of the printing apparatus 100 and the user terminal 200 is connected to a communication network N1. The communication network N1 allows the devices that are connected to the communication network N1 to communicate with each other.

The communication network N1 is, for example, a wired communication network such as the Internet, a local area network (LAN), or a wide area network (WAN). Alternatively, the communication network N1 may be a wireless communication network such as a wireless local area network (LAN) or a short-range wireless communication network, or a mobile communication network such as worldwide interoperability for microwave access (WiMAX), long term evolution (LTE), or 5th generation (5G) network.

The printing apparatus 100 is an image forming apparatus that prints print data on a print medium. In other words, the printing apparatus 100 is an image forming apparatus that prints an image on a print medium based on print data. The printing apparatus according to the present embodiment is a liquid discharging apparatus that discharges liquid from a head onto a recording medium conveyed in a conveyance direction to form an image on the recording medium. The printing apparatus according to the present embodiment is, for example, an inkjet printer. The print data is electronic data indicating the image to be formed on the print medium. For example, characters, figures, and photographs are laid out in the image.

The print medium according to the present embodiment is a print medium (also referred to as an illumination medium) that can be used for an illumination advertisement medium. The print medium has transparency so that illumination light emitted from the inside of the illumination advertisement medium is transmitted to the outside of the illumination advertisement medium. The degree of transparency, such as transparency or translucency, can be selected to suit the use for the illumination advertisement medium.

Examples of the print medium that is used for the illumination advertisement medium include, but are not limited to, a polyethylene terephthalate (PET) medium, a polyvinyl chloride (PVC) medium, and a fabric medium such as a tension fabric. For example, when the print medium is a PET medium, a medium in different transparency may be used such as a white medium, a milky-white medium, or a transparent medium. The print media according to the present embodiment are not limited to the aforementioned examples. Various print media may be used for illumination advertisement media.

The printing apparatus 100 prints print data on a print medium according to a print job. The print job according to the present embodiment includes print data indicating contents to be printed and print settings such as the number of sheets to be printed. The print job is input from the user terminal 200 to the printing apparatus 100 through the communication network N1 by an operation of an operator. The printing apparatus 100 can perform operations such as starting the print job, pausing the print job, resuming the print job, and ending the print job, in response to an operation through an operation screen displayed on the control panel.

The user terminal 200 is an information processing terminal that is operated by an operator. The user terminal 200 is, for example, a computer. Alternatively, the user terminal 200 may be, for example, a smartphone or a tablet terminal.

The user terminal 200 generates a print job in response to an operation of the operator and transmits the print job to the printing apparatus 100. The user terminal 200 outputs a message indicating, for example, the printing state received from the printing apparatus 100 to the operator.

The user terminal 200 is not limited to an information processing apparatus provided that the user terminal 200 is an apparatus having a communication function. Examples of the user terminal 200 include, but are not limited to, output devices such as a projector (PJ), an interactive whiteboard (IWB; an electronic whiteboard that can perform mutual communication and has a blackboard function), and digital signage, a head-up display (HUD), an industrial machine, an imaging device, a sound collecting device, a medical device, a networked home appliance, an automobile (connected car), a laptop personal computer (PC), a mobile phone, a smartphone, a tablet terminal, a game console, a personal digital assistant (PDA), a digital camera, a wearable PC, and a desktop PC.

The overall configuration of the printing system 1000 illustrated in FIG. 5 is merely an example. Various system configurations may be employed depending on the use or purposes. For example, a plurality of printing apparatuses 100 or user terminals 200 may be included in the printing system 1000. FIG. 5 illustrates an example division of apparatuses such as the printing apparatus 100 and the user terminal 200.

<Hardware Configuration of Printing Apparatus>

Referring to FIGS. 6 to 9, a description is given below of a hardware configuration of the printing apparatus 100 according to the present embodiment.

Figure 6:
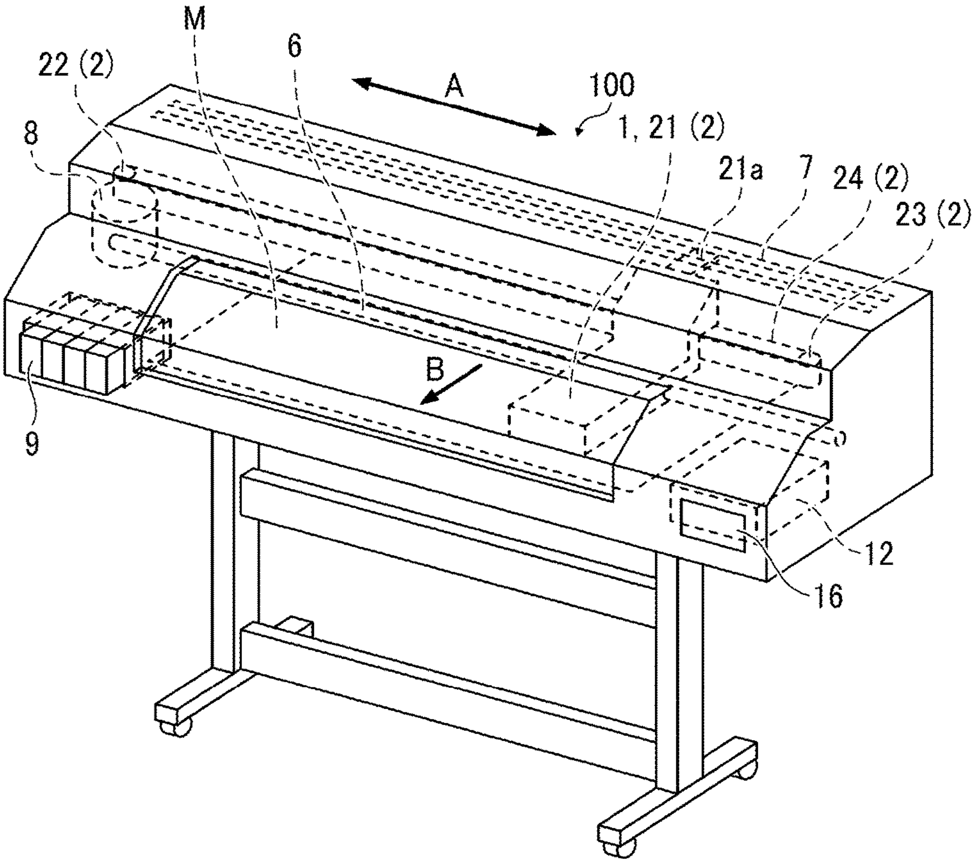
FIG. 6 is a perspective view of the inside of a printing apparatus according to an embodiment of the present disclosure.

FIG. 6 is a perspective view of the inside of the printing apparatus 100 according to the present embodiment.

Figure 7:
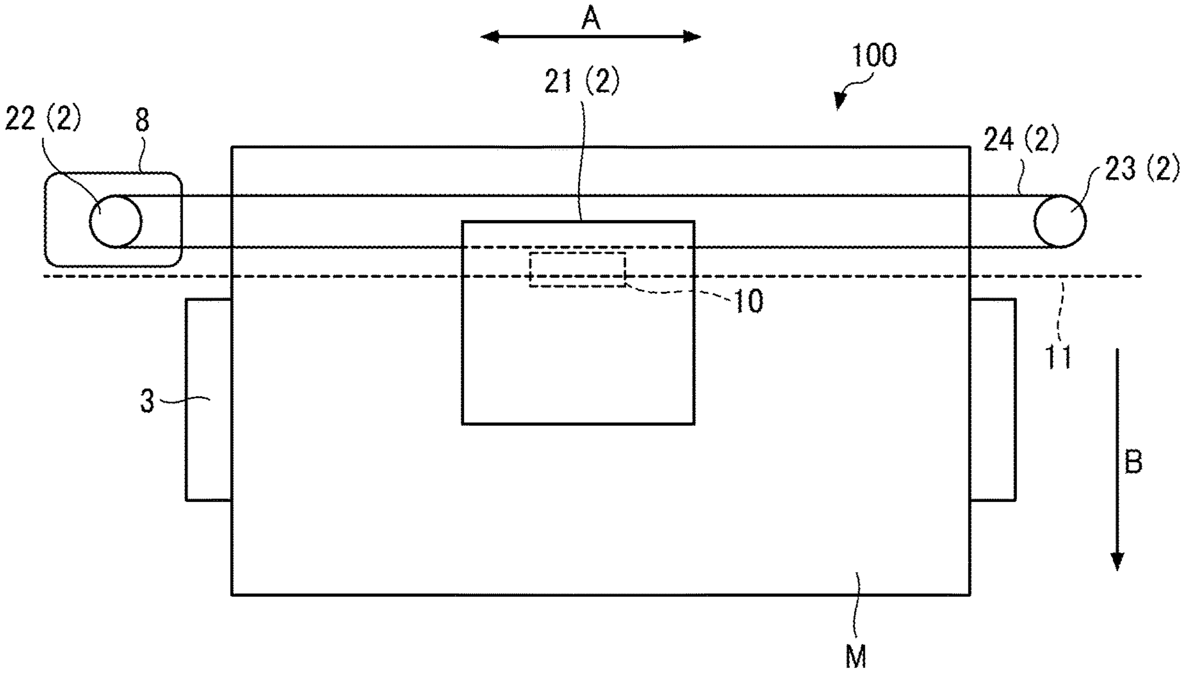
FIG. 7 is a top view of a printing apparatus according to an embodiment of the present disclosure.

FIG. 7 is a top view of the printing apparatus 100 according to the present embodiment.

Figure 8:
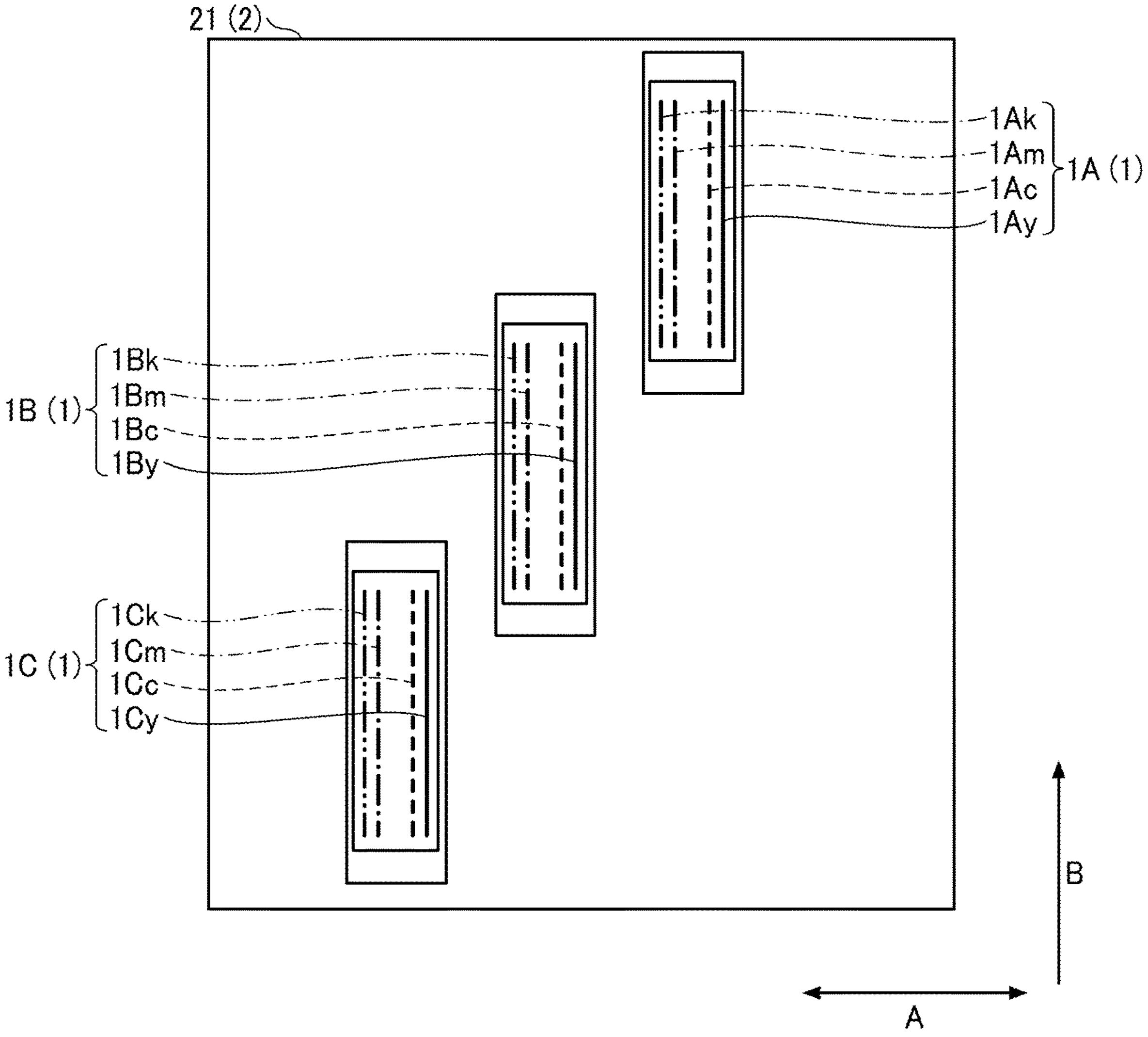
FIG. 8 is a diagram illustrating a configuration of a carriage according to an embodiment of the present disclosure.

FIG. 8 is a diagram illustrating a configuration of a carriage included in the printing apparatus 100 according to the present embodiment.

Figure 9:
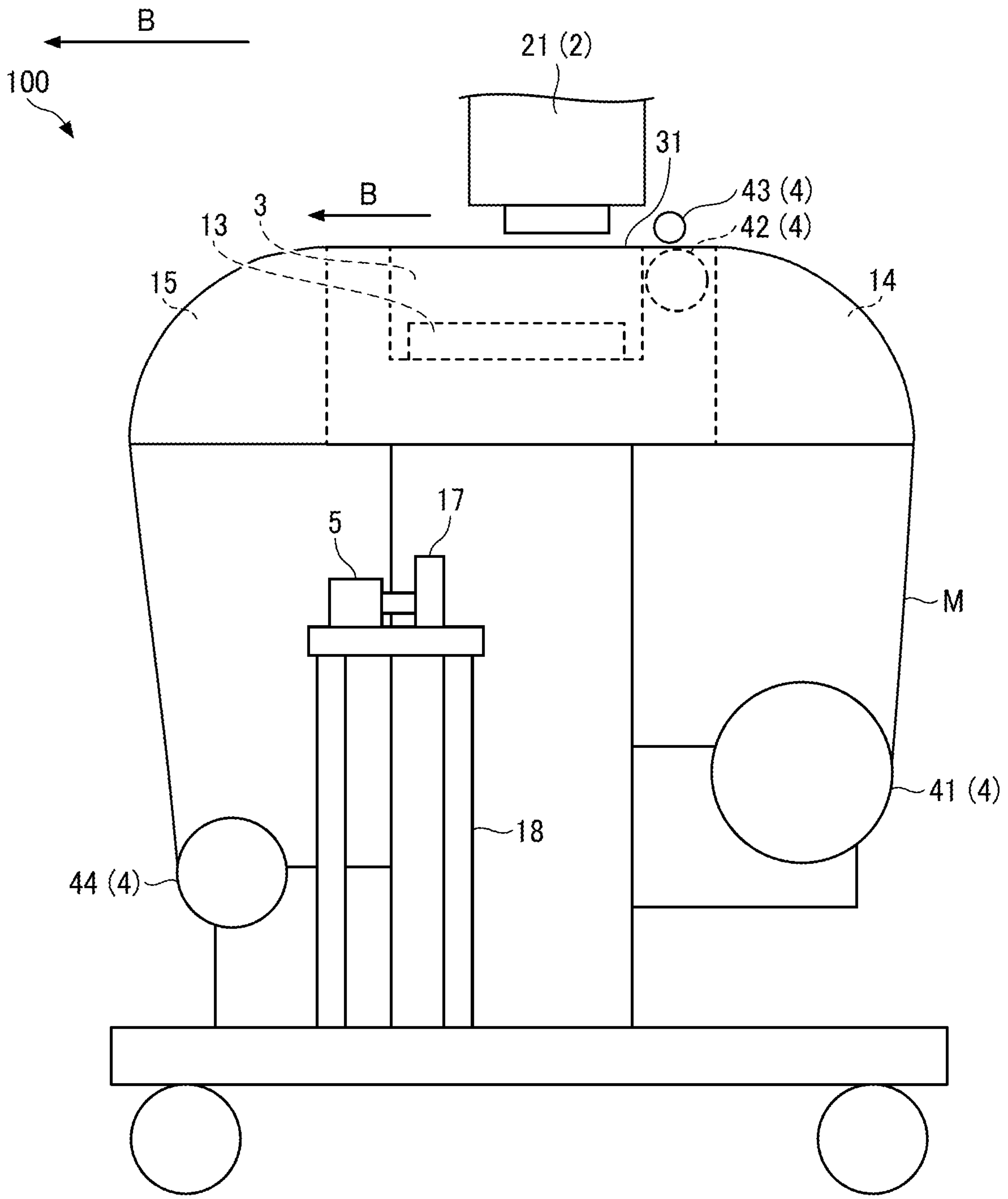
FIG. 9 is a side view of a printing apparatus according to an embodiment of the present disclosure.

FIG. 9 is a side view of the printing apparatus 100 according to the present embodiment.

As illustrated in FIGS. 6 to 9, the printing apparatus 100 includes heads 1, a first moving assembly 2, a support 3, a second moving assembly 4, a light 5, and a control panel 16.

The printing apparatus 100 is, for example, a serial image forming apparatus that forms an image on the print medium M with ink, which is an example of liquid. The printing apparatus 100 causes the second moving assembly 4 to intermittently convey the print medium M in a second direction B. While the conveyance of the print medium M is stopped, the printing apparatus 100 discharges ink from the heads 1 onto the print medium M on the support 3 while causing the first moving assembly 2 to move the heads 1 forward and backward alternately in a first direction A. Thus, the printing apparatus 100 forms an image on the print medium M.

The first moving assembly 2 includes a carriage 21, a driving pulley 22, a driven pulley 23, and a timing belt 24 to move the heads 1 relative to the print medium M in the first direction A.

The carriage 21 moves the heads 1 relative to the print medium M in the first direction A. As illustrated in FIG. 6, the carriage 21 is supported by a main guide rod 6 extending in the first direction A and reciprocates in the first direction A. The carriage 21 includes a coupler 21*a*. The coupler 21*a* is engaged with a sub-guide 7 disposed parallel to the main guide rod 6 to stabilize the posture of the carriage 21.

The carriage 21 is coupled to a timing belt 24 entrained around a driving pulley 22 and a driven pulley 23. The driving pulley 22 is rotated by driving of a first motor 8. The driven pulley 23 includes an assembly to adjust the distance between the driven pulley 23 and the driving pulley 22. With the assembly, the driven pulley 23 applies a given degree of tension to the timing belt 24.

The carriage 21 can reciprocate in the first direction A when the first motor 8 drives and rotates the timing belt 24. For example, as illustrated in FIG. 7, the amount and speed of movement of the carriage 21 are controlled based on an encoder value that is output by an encoder sensor 10 mounted on the carriage 21 when the encoder sensor 10 detects a mark of an encoder sheet 11.

As illustrated in FIG. 8, the carriage 21 carries the three heads 1 including heads 1A, 1B, and 1C. FIG. 8 illustrates the carriage 21 viewed from the print medium M facing the carriage 21. The heads 1 discharge ink onto the print medium M.

Specifically, the head 1A includes a nozzle row 1Ay, a nozzle row 1Ac, a nozzle row 1Am, and a nozzle row 1Ak. The nozzle row 1Ay includes a plurality of nozzles aligned to discharge yellow (Y) ink. The nozzle row 1Ac includes a plurality of nozzles aligned to discharge cyan (C) ink. The nozzle row 1Am includes a plurality of nozzles aligned to discharge magenta (M) ink. The nozzle row 1Ak includes a plurality of nozzles aligned to discharge black (K) ink. Similarly, the head 1B includes a nozzle row 1By, a nozzle row 1Bc, a nozzle row 1Bm, a nozzle row 1Bk. The head 1C includes a nozzle row 1Cy, a nozzle row 1Cc, a nozzle row 1Cm, and a nozzle row 1Ck. The three heads 1 are supported by the carriage 21 such that the nozzles face the print medium M.

The heads 1A, 1B, and 1C are located side by side in the first direction A and the second direction B. Such location allows the printing apparatus 100 to form an image in a wide area of the print medium M in one movement of the carriage 21 in the first direction A.

In FIG. 6, the carriage 21 does not carry cartridges 9 from which ink is supplied to the three heads 1. The cartridges 9 are disposed at given positions inside the printing apparatus 100.

The cartridges 9 are coupled to the three heads 1 through pipes so that the ink is supplied through the pipes from the cartridges 9 to the three heads 1.

The cartridges 9 and a maintenance assembly 12 that maintains the reliability of the three heads 1 are disposed across the carriage 21 in the first direction A. For example, the maintenance assembly 12 cleans and caps the discharge faces of the three heads 1 and discharges unnecessary ink from the three heads 1.

As illustrated in FIG. 9, the print medium M is placed on the support 3. Thus, the support 3 supports the print medium M according to the present embodiment. The support 3 is a box-shaped component having a placement face 31 facing the three heads 1. The print medium M is placed on the placement face 31. The support 3 has a plurality of through holes penetrating in a direction substantially orthogonal to the placement face 31. The printing apparatus 100 activates a suction fan 13 disposed inside the support 3 to suck the print medium M to the placement face 31. Thus, the printing apparatus 100 prevents the falling of the print medium M from the support 3.

The second moving assembly 4 includes an unwinder 41, a driving roller 42, a driven roller 43, and a winder 44 to move the print medium M relative to the three heads 1 in the second direction B intersecting the first direction A. The second moving assembly 4 intermittently conveys, with the driving roller 42 and the driven roller 43, the print medium M unwound from the unwinder 41 to the winder 44 via the support 3. Thus, the second moving assembly 4 moves the print medium M relative to the three heads 1.

The unwinder 41 includes a roll body that includes a hollow shaft such as a paper tube as a core around which the print medium M is wound in a roll shape. The print medium M is unwound from the roll by the rotation of the roll body.

The driving roller 42 is rotated by a second motor. The driven roller 43 is rotated in accordance with the rotation of the driving roller 42. The printing apparatus 100 conveys the print medium M sandwiched between the driving roller 42 and the driven roller 43.

The winder 44 includes a hollow shaft such as a paper tube as a core. Since the leading end of the print medium M adheres to the hollow shaft with, for example, an adhesive such as tape, the winder 44 can wind the print medium M around the hollow shaft.

In the printing apparatus 100, the conveyance of the print medium M by the second moving assembly 4 is guided by a sheet feeding guide 14 and a sheet ejection guide 15 that are respectively disposed upstream and downstream from the support 3 in the second direction B.

The light 5 irradiates the printed print medium M ejected by the sheet ejection guide 15 with illumination light from behind a printed face of the print medium M between the sheet ejection guide 15 and the winder 44. The light 5 is a lighting device that can adjust the amount of light and the color temperature. The light 5 is, for example, an LED lighting device.

Figure 10:
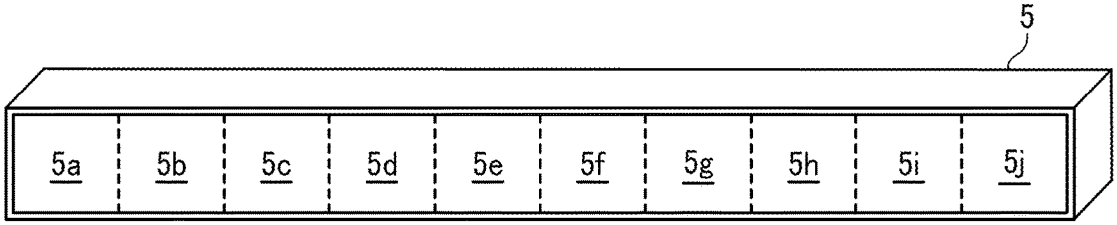
FIG. 10 is a perspective view of a light according to an embodiment of the present disclosure.

FIG. 10 is a perspective view of the light 5 according to the present embodiment.

As illustrated in FIG. 10, the light 5 is a rectangular parallelepiped having a relatively large aspect ratio. The light 5 includes, on one side, a plurality of light sources 5*a* to 5*j* aligned in a longitudinal direction of the light 5. The light sources 5*a* to 5*j* can be turned on and off independently from each other. The amount of light of the light sources 5*a* to 5*j* can be individually adjusted. Similarly, the color temperature of the light sources 5*a* to 5*j* can be individually adjusted. For example, the widths of the light sources 5*a* to 5*j* that emit illumination light can be controlled based on the width of the print medium M. Although FIG. 10 illustrates the light 5 including the ten light sources 5*a* to 5*j*, the number of light sources included in the light 5 may be increased or decreased as desired.

The other side of the light 5, which is opposite the side on which the light sources 5*a* to 5*j* are aligned, is coupled to, for example, a power cord that supplies power to each of the light sources 5*a* to 5*j* and a communication cable that connects the light 5 to a control device 50 that controls the printing apparatus 100. The light 5 is attached to a rail frame 17 such that the position of the light 5 in a longitudinal direction of the frame 17 can be adjusted. The frame 17 may be formed in the shape of a hollow duct rail. In this case, the position of the light 5 can be adjusted with, for example, the power cord and the communication cable housed inside the frame 17.

The light 5 may be disposed such that illumination light does not directly enter the field of view of an operator standing in front of the printing apparatus 100. For example, the light 5 may be disposed at a height closer to the sheet ejection guide 15 than to the winder 44 and at a back position when viewed from the front of the printing apparatus 100. Optionally, a light shield may be disposed or an irradiation angle may be adjusted so that the illumination light is not emitted wider than the print medium M.

The light 5 may be disposed so as not to be fixed to the printing apparatus 100. In the example illustrated in FIG. 9, the light 5 is attached to a stand 18 that is not fixed to the printing apparatus 100. Since the light 5 is disposed so as not to be fixed to the printing apparatus 100, the electronic components of the light 5 are prevented from being consumed due to the vibration of the printing apparatus 100 during printing.

Figure 11:
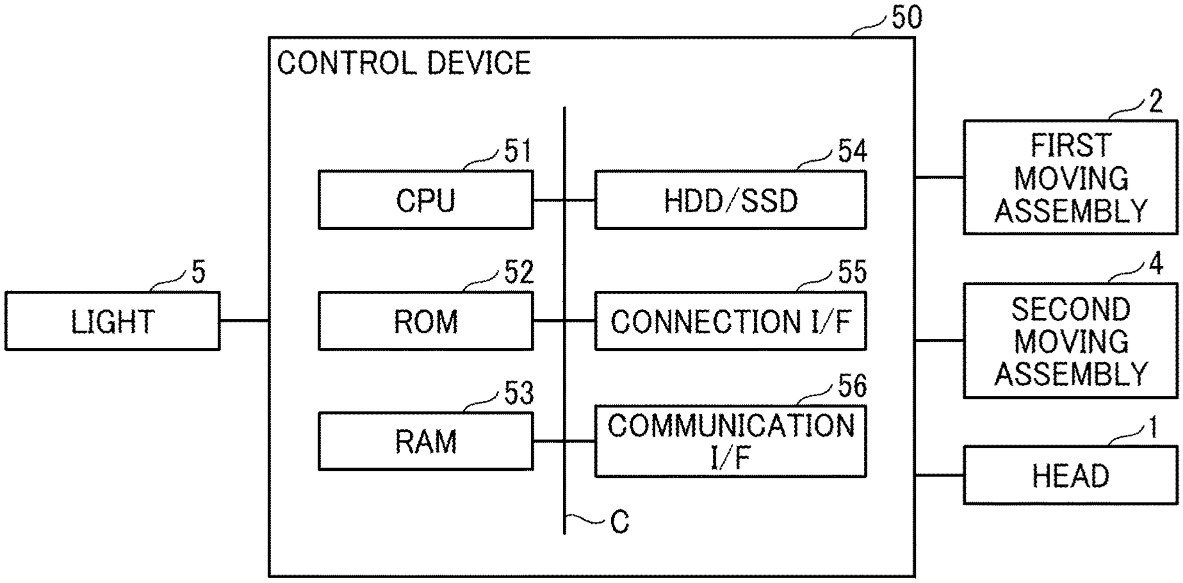
FIG. 11 is a block diagram illustrating a hardware configuration of a control device according to an embodiment of the present disclosure.

Referring to FIG. 11, a description is given below of a hardware configuration of the control device 50 that controls the printing apparatus 100 and peripheral devices according to the present embodiment.

FIG. 11 is a block diagram illustrating a hardware configuration of the control device 50 according to the present embodiment.

The control device 50 is implemented by, for example, a computer. The control device 50 includes a central processing unit (CPU) 51, a read-only memory (ROM) 52, a random access memory (RAM) 53, a hard disk drive/solid state drive (HDD/SSD) 54, a connection interface (I/F) 55, and a communication I/F 56. The CPU 51, the ROM 52, the RAM 53, the HDD/SSD 54, the connection I/F 55, and the communication I/F 56 are communicably connected to each other through a system bus C.

The CPU 51 executes control processing including various kinds of arithmetic processing. The ROM 52 stores a program such as an initial program loader (IPL) to boot the CPU 51. The RAM 53 is used as a work area for the CPU 51. The HDD/SSD 54 stores various kinds of information such as programs.

The connection I/F 55 is an interface that connects the control device 50 to various devices. For example, the connection I/F 55 connects the control device 50 to the light 5.

The communication I/F 56 is an interface that enables communication between the control device 50 and an external device through a communication network. For example, the control device 50 can receive print data, which is a source of an image to be formed on the print medium M, from the user terminal 200 through the communication I/F 56.

At least part of the functions implemented by program executed by the CPU 51 may be implemented by an electric circuit or an electronic circuit.

<Hardware Configuration of Computer>

The user terminal 200 according to the present embodiment is implemented by a computer.

Figure 12:
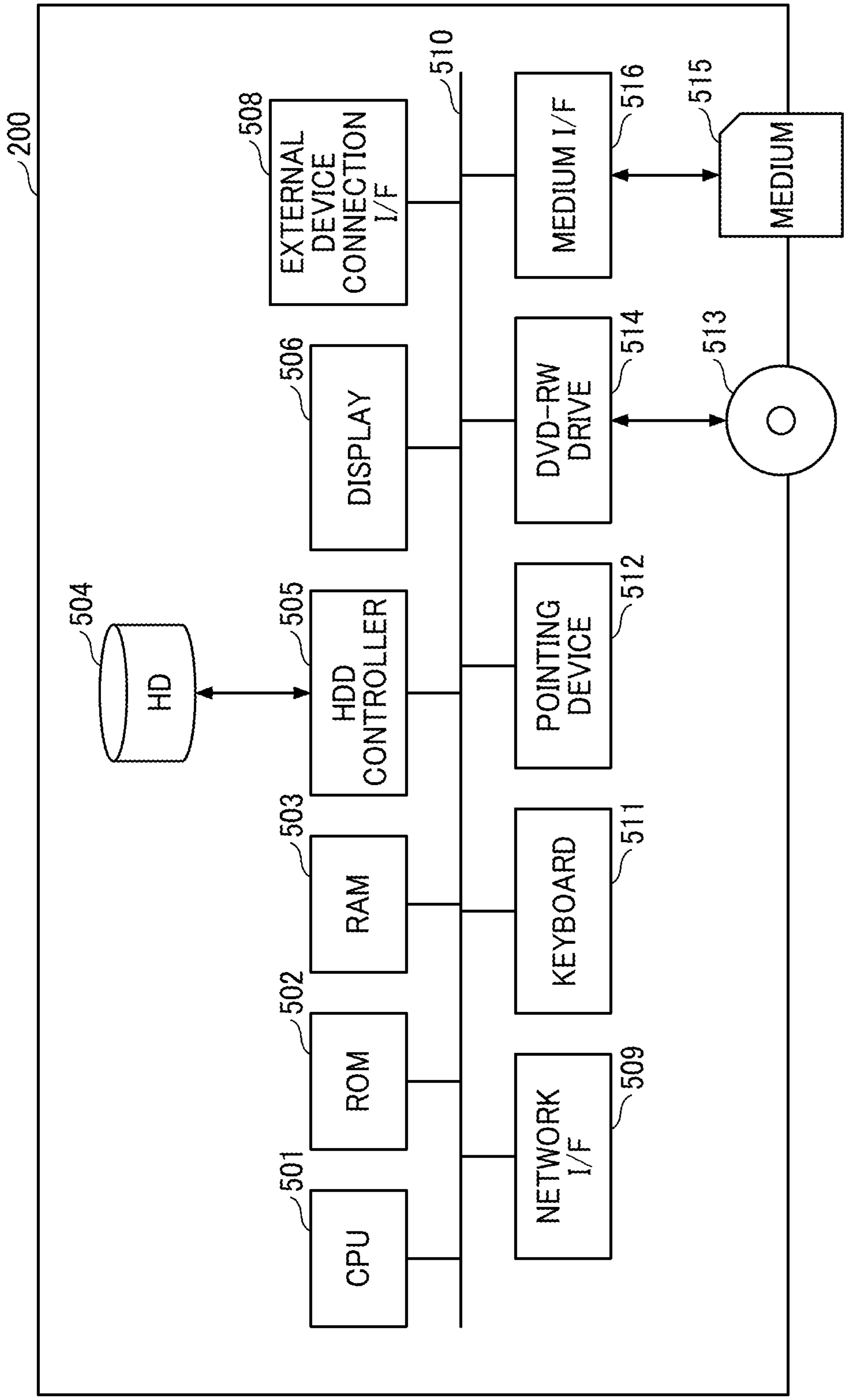
FIG. 12 is a block diagram illustrating a hardware configuration of a computer according to an embodiment of the present disclosure.

FIG. 12 is a diagram illustrating a hardware configuration of a computer when the user terminal 200 is implemented by the computer, according to the present embodiment.

As illustrated in FIG. 12, the computer according to the present embodiment includes a CPU 501, a ROM 502, a RAM 503, a hard disk (HD) 504, an HDD controller 505, a display 506, an external device connection I/F 508, a network I/F 509, a bus line 510, a keyboard 511, a pointing device 512, a digital versatile disk rewritable (DVD-RW) drive 514, and a medium I/F 516.

The CPU 501 controls the entire operation of the computer. The ROM 502 stores programs such as an IPL to boot the CPU 501. The RAM 503 is used as a work area for the CPU 501. The HD 504 stores various kinds of data such as programs. The HDD controller 505 controls the reading and writing of various kinds of data from and to the HD 504 under control of the CPU 501.

The display 506 displays various kinds of information such as a cursor, a menu, a window, characters, or an image. The external device connection I/F 508 is an interface that connects the computer to various external devices. Examples of the external devices include, but are not limited to, a universal serial bus (USB) memory and a printer. The network I/F 509 is an interface that enables data communication through the communication network N1. The bus line 510 is, for example, an address bus or a data bus, which electrically connects the components such as the CPU 501 illustrated in FIG. 12.

According to the present embodiment, the keyboard 511 serves as an input device provided with a plurality of keys for allowing a user to enter, for example, characters, numerical values, or various instructions. The pointing device 512 serves as an input device that allows a user to, for example, select or execute a specific instruction, select a target for processing, or move a cursor being displayed. When the display 506 is operable through a touch panel, a touch operation may be input means. The same applies to the display of the control panel 16 on an operation screen 600 described later. The DVD-RW drive 514 controls the reading and writing of various kinds of data from and to a DVD-RW 513, which serves as a removable recording medium according to the present embodiment. The removable recording medium is not limited to the DVD-RW. For example, the removable recording medium may be a DVD-recordable (DVD-R). The medium I/F 516 controls the reading and writing (storing) of data from and to a recording medium 515 such as a flash memory.

<Functional Configuration of Printing System>

Figure 13:
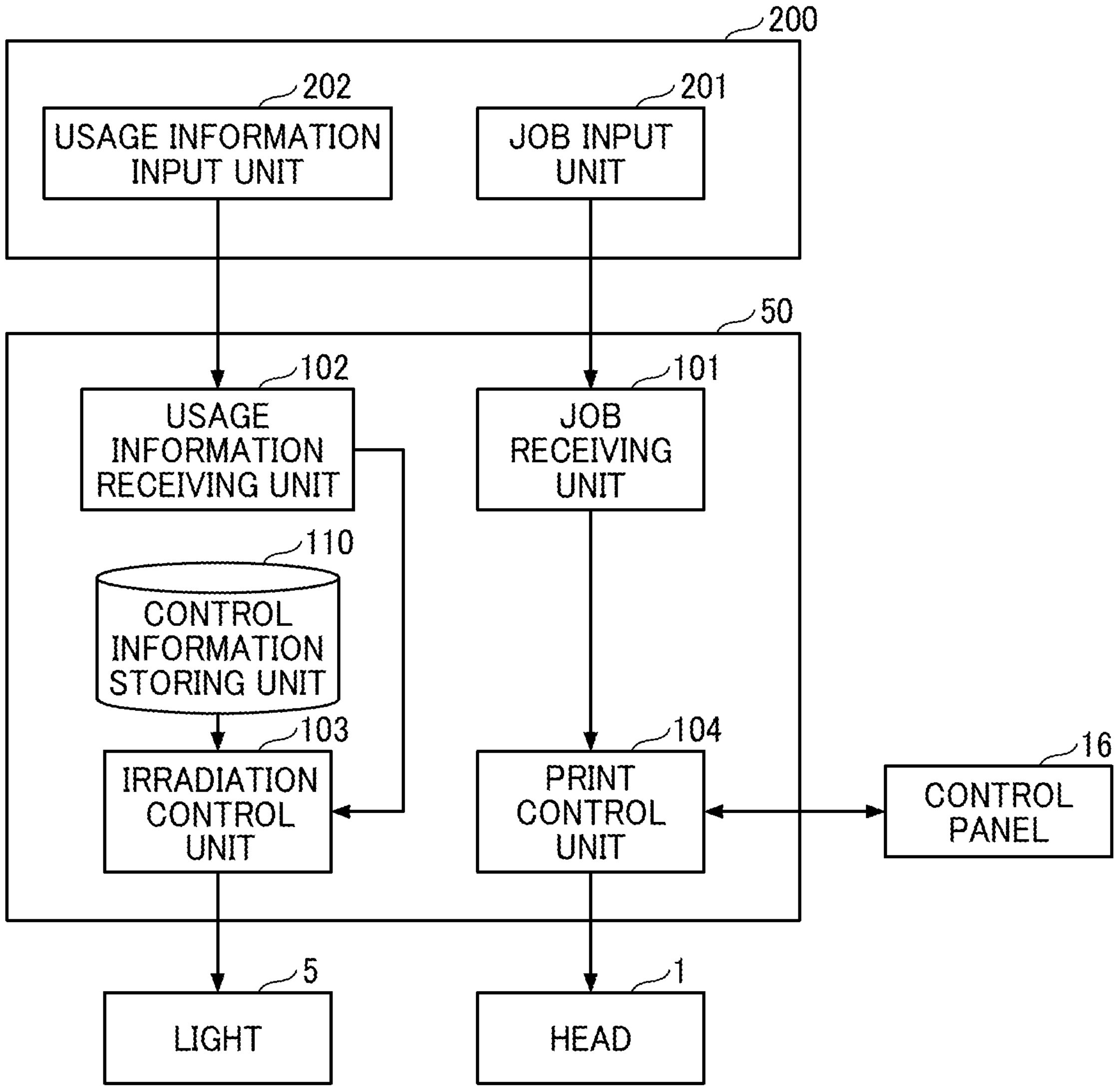
FIG. 13 is a block diagram illustrating a functional configuration of a printing system according to a first embodiment of the present disclosure.

Referring to FIG. 13, a description is given below of a functional configuration of the printing system 1000 according to the present embodiment.

FIG. 13 is a block diagram illustrating a functional configuration of the printing system 1000 according to the present embodiment.

<<Functional Configuration of Control Device>>

As illustrated in FIG. 13, the control device 50 according to the present embodiment includes a job receiving unit 101, a usage information receiving unit 102, an irradiation control unit 103, a print control unit 104, and a control information storing unit 110.

The job receiving unit 101, the usage information receiving unit 102, the irradiation control unit 103, and the print control unit 104 are implemented by, for example, processing executed by the CPU 51 and the communication I/F 56 according to the program loaded from the ROM 52 into the RAM 53 illustrated in FIG. 11.

The control information storing unit 110 is implemented by, for example, the HDD/SSD 54 illustrated in FIG. 11. Reading of data that is stored in the HDD/SSD 54 and writing information in the HDD/SSD 54 is performed by, for example, an HDD controller of the control device 50.

The job receiving unit 101 receives a print job from the user terminal 200. The print job according to the present embodiment includes print data indicating an image to be formed on a print medium.

The usage information receiving unit 102 receives usage information from the user terminal 200. The usage information according to the present embodiment includes the attribute information of a print medium and the usage environment of an illumination advertisement medium. The attribute information of a print medium is, for example, information indicating the transparency of the print medium. The attribute information of a print medium may be information by which the transparency of the print medium can be specified, such as the type, material, or model number of the print medium. The usage environment of an illumination advertisement medium is, for example, information indicating the environment in which the illumination advertisement medium is visually recognized, such as the place, season, time of day, or production.

The irradiation control unit 103 determines an irradiation condition of the illumination light that is emitted from the light sources of the light 5, based on the usage information received by the usage information receiving unit 102. The irradiation control unit 103 controls the light sources of the light 5 based on the determined irradiation condition. Examples of the irradiation condition according to the present embodiment include, but are not limited to, the color temperature and the amount of light. The irradiation control unit 103 may determine an irradiation pattern. The irradiation pattern according to the present embodiment is information indicating a pattern for changing the irradiation condition of the illumination light as time passes.

The print control unit 104 prints print data on a print medium based on the print job received by the job receiving unit 101. The print control unit 104 controls the heads 1, the first moving assembly 2, and the second moving assembly 4 to print the print data on the print medium M placed on the printing apparatus 100. In the following description, the heads 1, the first moving assembly 2, and the second moving assembly 4 may be collectively referred to as a "print execution device."

Control information for controlling the illumination light emitted from the light sources of the light 5 is stored in advance in the control information storing unit 110. Examples of the control information according to the present embodiment include, but are not limited to, an attribute condition and a usage condition. The attribute condition is information that defines the irradiation condition based on the attribute information of a print medium. The usage condition is information that defines the irradiation condition based on the usage environment of an illumination advertisement medium. The attribute condition is stored in an attribute condition table stored in the control information storing unit 110. The usage condition is stored in a usage condition table stored in the control information storing unit 110.

<<Functional Configuration of User Terminal>>

As illustrated in FIG. 13, the user terminal 200 according to the present embodiment includes a job input unit 201 and a usage information input unit 202.

The job input unit 201 and the usage information input unit 202 are implemented by, for example, processing executed by the CPU 501 and the network I/F 509 according to the program loaded from the ROM 502 into the RAM 503 illustrated in FIG. 12.

The job input unit 201 receives an input of a print job in response to an operation by an operator. The job input unit 201 transmits the received print job to the printing apparatus 100.

The usage information input unit 202 receives an input of usage information of an illumination advertisement medium in response to an operation by the operator. The usage information input unit 202 transmits the received usage information to the printing apparatus 100.

<Procedure for Executing Printing Method>

Referring to FIGS. 14 to 20, a description is given below of a procedure for executing a printing method according to the present embodiment.

Figure 14:
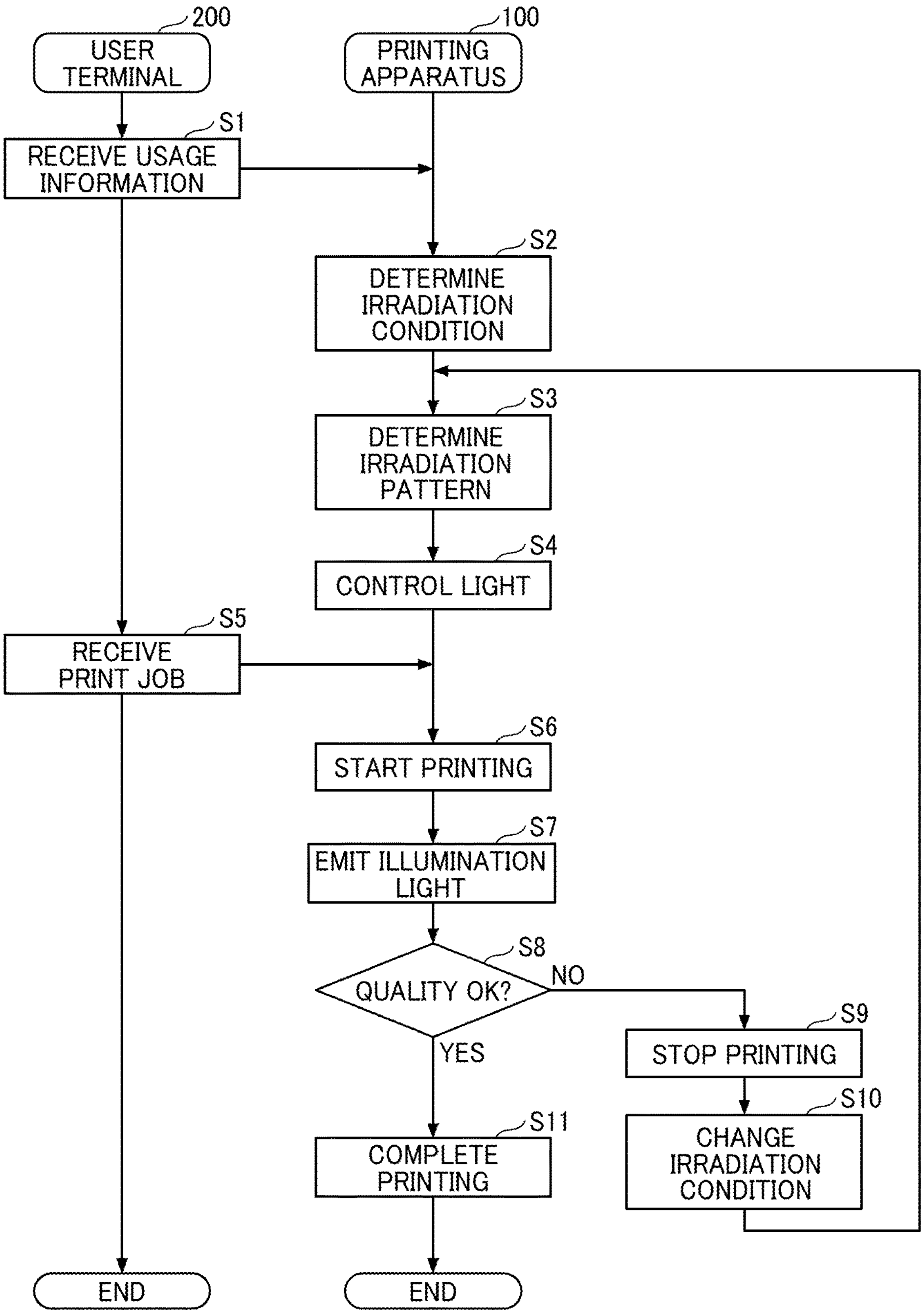
FIG. 14 is a flowchart of a procedure for executing a printing method according to the first embodiment of the present disclosure.

FIG. 14 is a flowchart of a procedure for executing a printing method according to the present embodiment.

In step S1, the usage information input unit 202 of the user terminal 200 displays a setting screen on the display 506 in response to an operation by an operator of the printing apparatus 100. The operation of displaying the setting screen is, for example, an operation of selecting a menu from a main menu. The setting screen according to the present embodiment is a setting screen for setting usage information including the attribute information of a print medium and the usage environment of an illumination advertisement medium.

<<Setting Screen>>

Figures 15, 16:
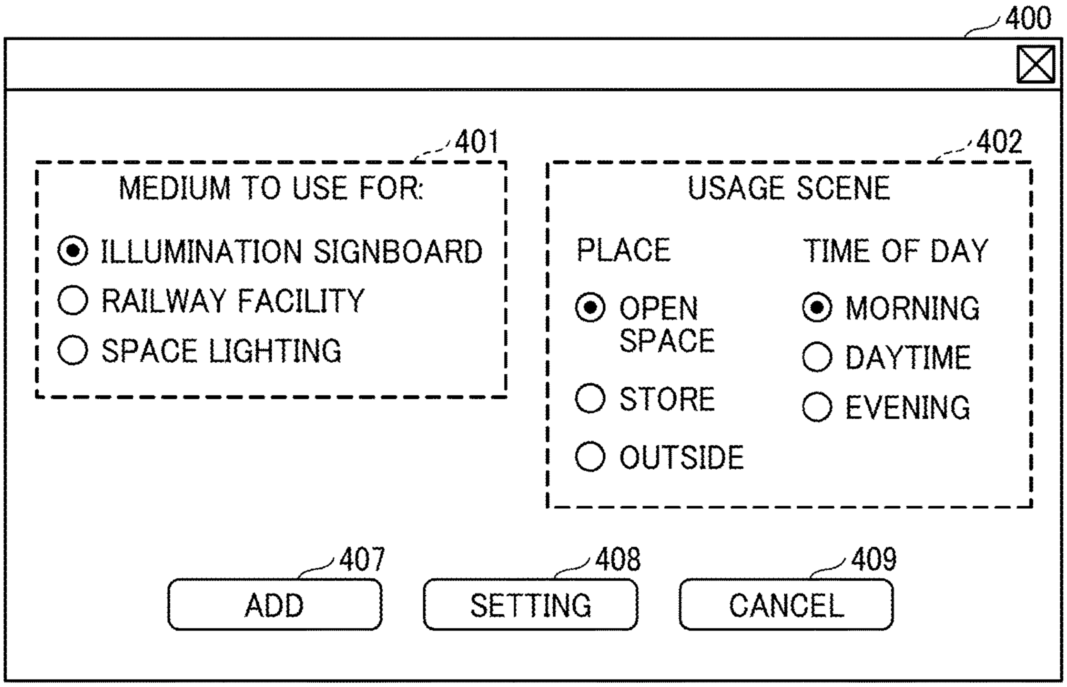
FIG. 15 is a diagram illustrating a setting screen according to the first embodiment of the present disclosure.
FIG. 16 is a diagram illustrating an attribute condition table according to the first embodiment of the present disclosure.

Referring to FIG. 15, a description is given below of a setting screen according to the present embodiment.

FIG. 15 is a diagram illustrating a setting screen 400 according to the present embodiment.

As illustrated in FIG. 15, the setting screen 400 according to the present embodiment includes a medium-to-use selection field 401, a usage-scene selection field 402, an "add" key 407, a setting key 408, and a cancel key 409.

In the medium-to-use selection field 401, a list of attribute information of usable print media is selectively displayed. In the example illustrated in FIG. 15, radio buttons that enable exclusive selection of a type of print medium are displayed in the medium-to-use selection field 401.

In the usage-scene selection field 402, a list of expected usage environments of the illumination advertisement medium is selectively displayed. The usage environment of the illumination advertisement medium may be selectable for each classification. In the usage-scene selection field 402 in the example illustrated in FIG. 15, radio buttons that enable exclusive selection of a usage environment are displayed for each classification of the place and the time of day when the illumination advertisement medium is used.

When an operator presses the "add" key 407, a screen is displayed to allow the operator to add the attribute information of the print medium or the usage environment of the illumination advertisement medium. When the operator wants to use a print medium with attribute information different from the attribute information registered in advance or wants to use an illumination advertisement medium in an environment different from a usage environment registered in advance, the operator can add new attribute information of the print medium or a new usage environment of the illumination advertisement medium on the screen.

When the operator presses the setting key 408, the input of the usage information is received, including the attribute information of the print medium selected in the medium-to-use selection field 401 and the usage environment of the illumination advertisement medium selected in the usage-scene selection field 402. When the operator presses the cancel key 409, the usage information is not input, and the setting screen 400 is closed.

Referring back to FIG. 14, in step S1, the usage information input unit 202 receives the usage information selected by the operator on the setting screen 400. The usage information input unit 202 then transmits the received usage information to the printing apparatus 100.

In step S2, the usage information receiving unit 102 of the control device 50 receives the usage information from the user terminal 200. The usage information receiving unit 102 then transmits the received usage information to the irradiation control unit 103.

The irradiation control unit 103 receives the usage information from the usage information receiving unit 102. Based on the received usage information, the irradiation control unit 103 then determines the irradiation condition of the illumination light emitted from the light sources of the light 5.

First, the irradiation control unit 103 reads the control information stored in the control information storing unit 110. The control information includes the attribute condition and the usage condition. The irradiation control unit 103 then acquires the attribute condition that matches the attribute information of the print medium. Subsequently, the irradiation control unit 103 acquires the usage condition that matches the usage environment of the illumination advertisement medium. Then, the irradiation control unit 103 determines the irradiation condition based on the acquired attribute condition and usage condition.

<<Attribute Condition Table>>

Referring to FIG. 16, a description is given below of an attribute condition table according to the present embodiment.

FIG. 16 is a diagram illustrating an attribute condition table according to the present embodiment.

As illustrated in FIG. 16, the attribute condition table serving as an attribute condition according to the present embodiment stores information indicating the amount of illumination light for each combination of the medium to use and the color. The medium to use is information indicating the types of print media, whereas the color is information indicating the color temperatures of the illumination light.

For example, in the attribute condition table according to the present embodiment, the color temperature is defined by Kelvin (k) whereas the amount of light is defined by lux (lx). Although a description is given of a case in which the types of print media are classified based on the use such as an illumination signboard, a railway facility, or space lighting with reference to FIG. 16, the types of print media may be defined by any classification provided that the attribute information (transmittance in the example of FIG. 16) of the print media is different from each other. In other words, the attribute condition table illustrated in FIG. 16 is information that defines the amount of illumination light based on the transmittance of the print medium and the color temperature of the illumination light.

For example, since a print medium for an illuminated signboard has a transmittance higher than that of the other types of print media, the amounts of light for the print medium for the illumination signboard are lower (in a range of from 1000 lx to 4000 lx in the example of FIG. 16) than those for the other types of print media. For example, when a daylight (overcast) color of 6500 k is selected for a "cool production with strong blueness" of an illumination signboard for use in summer, the amount of illumination light is 4000 lx. The color temperature of the illumination light can be set independently from the amount of light. For example, a filter may be disposed in front of the light 5 to adjust the color temperature.

<<Usage Condition Table>>

Referring to FIGS. 17 to 19, a description is given below of a usage condition table serving as a usage condition according to the present embodiment.

FIG. 17 is a diagram illustrating a first example of the usage condition table according to the present embodiment.

The first example of the usage condition table is a table storing the usage condition for adjusting the irradiation condition based on the place where an illumination advertisement medium is disposed and the time of day when the illumination advertisement medium is used. In the following description, the first example of the usage condition table may be referred to as a "usage condition table related to the time of day."

As illustrated in FIG. 17, the usage condition table related to the time of day stores adjustment information for adjusting the color temperature and the amount of light for each combination of the place and the time of day. The adjustment information stored in the usage condition table includes a value by which a reference amount of light is increased or decreased and a ratio by which a reference color temperature is increased or decreased. The reference amount of light and the reference color temperature are determined based on the attribute condition table.

A description is given below of an example scene in which an illumination signboard for use in summer is used in an open space. In this case, based on the attribute condition table, the reference amount of light is determined to be 4000 lx whereas the reference color temperature is determined to be 6500 k. According to the usage condition table, when the illumination signboard is disposed in an open space, the amount of light and the color temperature are the reference amount of light and the reference color temperature, respectively, in the morning. In the daytime, the amount of light is decreased from the reference amount of light by 1000 lx to 3000 lx, and the color temperature is changed to 50% of the reference color temperature (i.e., 3250 k). In the evening, the amount of light is decreased from the reference amount of light by 1500 lx to 2500 lx, and the color temperature is changed to 90% of the reference color temperature (i.e., 5850 k). At night, the amount of light is decreased from the reference amount of light by 2500 lx to 1500 lx, and the color temperature is changed to 70% of the reference color temperature (i.e., 4550 k).

Thus, the irradiation condition is determined that is to be adjusted based on the place where the illumination advertisement medium is disposed and the time of day when the illumination advertisement medium is used. The usage environments such as the place and the time of day described above are merely examples. Any usage environment may be set based on a preferred environment.

FIG. 18 is a diagram illustrating a second example of the usage condition table according to the present embodiment.

The second example of the usage condition table is a table storing the usage condition for adjusting the irradiation condition based on the place where an illumination advertisement medium is disposed and the type of event held at the place. In the following description, the second example of the usage condition table may be referred to as a "usage condition table related to the event type."

As illustrated in FIG. 18, the usage condition table related to the event type stores adjustment information for adjusting the color temperature and the amount of light for each combination of the place and the event type.

For example, the usage condition table related to the event type stores adjustment information for atmospheres to be created, such as liveliness, calm, normal, and sale. These event types are merely examples. Any event type may be set based on, for example, the purpose of the event.

The usage condition table related to the event type is a usage condition table that complements the usage condition table related to the time of day. The color temperature and the amount of light determined according to the usage condition table related to the event type are prioritized over the color temperature and the amount of light determined according to the usage condition table related to the time of day. For this reason, the adjustment information may be set for not all combinations in the usage condition table related to the event type. When the adjustment information is not set in the usage condition table related to the event type, the color temperature and the amount of light determined according to the usage condition table related to the time of day are used.

FIG. 19 is a diagram illustrating a third example of the usage condition table according to the present embodiment.

The third example of the usage condition table is a table storing the usage condition for adjusting the irradiation condition based on the place where an illumination advertisement medium is disposed and the type of product displayed at the place. In the following description, the third example of the usage condition table may be referred to as a "usage condition table related to the product type."

As illustrated in FIG. 19, the usage condition table related to the product type stores adjustment information for adjusting the color temperature and the amount of light for each combination of the place and the product type. The usage condition table related to the product type stores adjustment information for product images such as summer goods, winter goods, kitchen, and gifts. These product types are merely examples. Any product type may be set based on, for example, the attribute of the product or the use of the product.

Like the usage condition table related to the event type, the usage condition table related to the product type is a usage condition table that complements the usage condition table related to the time of day. When the adjustment information is not set in the usage condition table related to the product type, the color temperature and the amount of light determined according to the usage condition table related to the time of day are used.

Although a description has been given of the examples in which the irradiation condition of the illumination light is adjusted based on the event type or the product type, the printing apparatus 100 according to the present embodiment may additionally define a usage condition table based on a viewpoint or may simply define the usage condition table related to the time of day.

Referring back to FIG. 14, in step S3, the irradiation control unit 103 of the control device 50 determines the irradiation pattern based on the attribute condition and the usage condition acquired in step S2.

For example, when multiple usage conditions are acquired, the irradiation control unit 103 determines the irradiation pattern for switching, at given time intervals, multiple irradiation conditions determined based on the multiple usage conditions. When a single usage condition is acquired, the irradiation control unit 103 may not determine the irradiation pattern.

For example, the irradiation control unit 103 determines the irradiation pattern for switching the irradiation conditions in response to the change in the time of day. In other words, when the usage condition table related to the time of day is defined, the irradiation control unit 103 determines the irradiation pattern for sequentially switching, at given time intervals, the irradiation condition corresponding to the morning, the irradiation condition corresponding to the daytime, the irradiation condition corresponding to the evening, and the irradiation condition corresponding to the night. The use of such an irradiation pattern facilitates confirmation of the appearance of the illumination advertisement medium for each time of day.

In step S4, the irradiation control unit 103 of the control device 50 controls the illumination light to be emitted from the light 5, based on the irradiation condition determined in step S2 and the irradiation pattern determined in step S3. Specifically, the irradiation control unit 103 controls the light sources of the light 5 such that the illumination light is emitted at the color temperature and the amount of light specified by the irradiation condition. When determining the irradiation pattern in step S3, the irradiation control unit 103 controls the light sources of the light 5 while switching the irradiation conditions according to the order specified by the irradiation pattern each time when the given time interval elapses.

In step S5, the job input unit 201 of the user terminal 200 receives an input of a print job in response to an operation by the operator. The job input unit 201 then transmits the received print job to the printing apparatus 100.

In step S6, the job receiving unit 101 of the control device 50 receives the print job from the user terminal 200. The job receiving unit 101 then displays, on the control panel 16, an operation screen to receive an operation for the received print job.

<<Operation Screen>>

Figure 20:
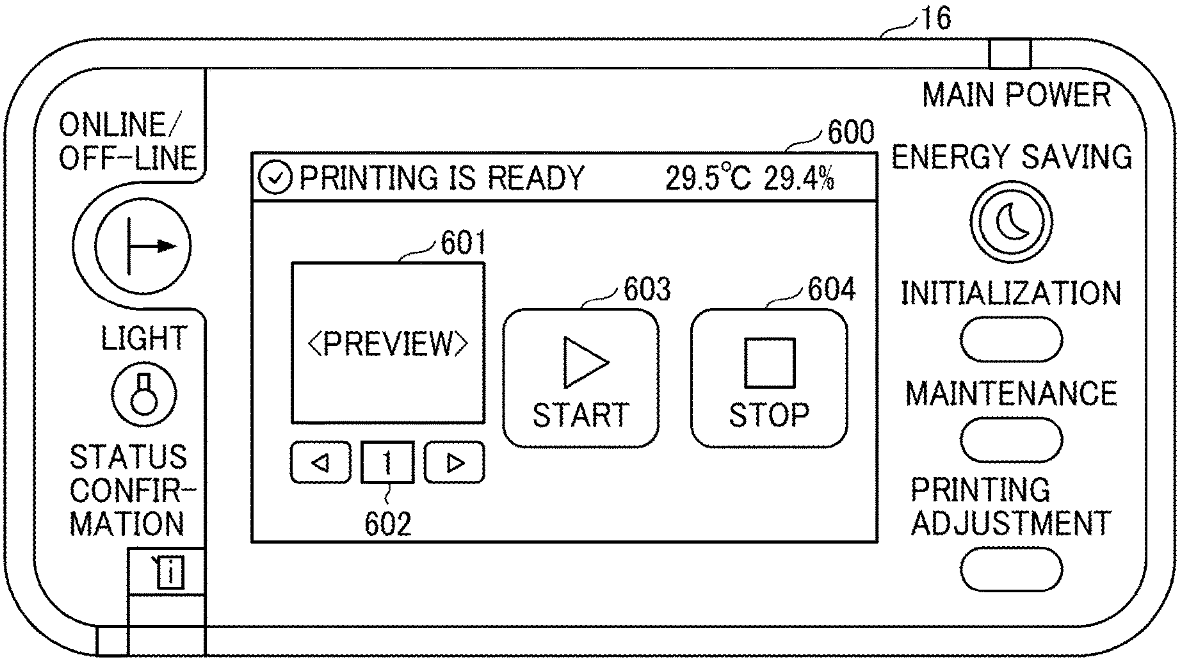
FIG. 20 is a diagram illustrating an operation screen according to the first embodiment of the present disclosure.

Referring to FIG. 20, a description is given below of an operation screen according to the present embodiment.

FIG. 20 is a diagram illustrating an operation screen 600 according to the present embodiment.

As illustrated in FIG. 20, the operation screen 600 according to the present embodiment includes a preview display field 601, a copy-number selection field 602, a start key 603, and a stop key 604. The operation screen 600 according to the present embodiment is displayed on a display of the control panel 16.

An image indicated by the print data included in the print job is previewed in the preview display field 601. The copy-number selection field 602 is displayed such that the number of copies to be printed can be changed. In the example of the operation screen illustrated in FIG. 20, the number of copies increases when the key on the right side of the copy-number selection field 602 is pressed, whereas the number of copies decreases when the key on the left side of the number-of-copies selection field 602 is pressed.

When the operator presses the start key 603, printing starts according to the print job. When the operator presses the stop key 604, the printing being executed is stopped. The start key 603 and the stop key 604 may be exclusively controlled such that when one of the start key 603 and the stop key 604 can be pressed, the other cannot be pressed.

Referring back to FIG. 14, in step S6, the print control unit 104 starts printing according to the print job in response to the operation by the operator on the operation screen 600. When the printing is started, the heads 1, the first moving assembly 2, and the second moving assembly 4 operate to print the print data on the print medium M placed on the printing apparatus 100.

In step S7, the light 5 emits illumination light, such that the operator can check the print quality of the printed print medium M. The operator of the printing apparatus 100 observes the printed print medium M, which is output from the printing apparatus 100, from the front side of the printing apparatus 100 to check the print quality of the printed print medium M. Since the printed print medium M is irradiated with the illumination light from behind the printed face of the print medium M by the light 5, the appearance of the print medium M when observed from the front side of the printing apparatus 100 reflects the actual usage environment (or an environment closer to the actual usage environment) of the illumination advertisement medium. When the operator stands in front of the printing apparatus 100 and observes the printed and output print medium M, the operator can check the print quality while considering the usage environment of the illumination advertisement medium.

In step S8, the printing apparatus 100 determines whether the print quality of the printed print medium M is sufficient. Specifically, in this example, the operator of the printing apparatus 100 determines whether the print quality of the printed print medium Mis sufficient. If the print quality of the printed print medium M is sufficient (YES in step S8), the operator does not need to do anything, such that no input is received at the printing apparatus 100. In this case, the printing apparatus 100 continues printing and advances the processing to step S11. By contrast, when the print quality of the printed print medium Mis insufficient (NO in step S8), the operator presses the stop key 604 on the operation screen 600, such that pressing of the stop key 604 is received. In this case, the printing apparatus 100 advances the processing to step S9.

In step S9, the print control unit 104 of the control device 50 stops printing in response to the operation by the operator on the operation screen 600.

In step S10, the irradiation control unit 103 of the control device 50 changes the irradiation condition in response to the operation of the operator. The irradiation condition may be changed by the operator selecting different usage information on the setting screen 400 or changing, through the user terminal 200, the irradiation condition specified by the attribute condition table or the usage condition table.

In step S11, the print control unit 104 of the control device 50 completes the printing. Specifically, the print medium M is printed by the number of copies selected in the copy-number selection field 602 of the operation screen 600. Subsequently, the print control unit 104 stops the operations of the heads 1, the first moving assembly 2, and the second moving assembly 4.

Effects of First Embodiment

The printing apparatus 100 according to the present embodiment irradiates a printed print medium that is used for an illumination advertisement medium, with illumination light from behind a printed face of the print medium. The printed matter that is used for the illumination advertisement medium is visually recognized while the printed matter is irradiated with illumination light from behind the printed face of the printed matter. Thus, the printing apparatus 100 according to the present embodiment allows an operator or user to efficiently check the quality of the printed matter that is used for the illumination advertisement medium.

The printing apparatus 100 according to the present embodiment determines the irradiation condition of the illumination light based on the attribute information of the print medium. For example, the attribute information of the print medium is transparency. The color temperature and the amount of light are examples of the irradiation condition. Thus, the printing apparatus 100 according to the present embodiment allows the operator or user to easily check the quality of the printed matter that is used for the illumination advertisement medium while considering the attribute information of the illumination advertisement medium.

The printing apparatus 100 according to the present embodiment determines the irradiation condition of the illumination light based on the usage environment of the illumination advertisement medium. Examples of the usage environment include, but are not limited to, the place, the season, the time of day, and the production. Thus, the printing apparatus 100 according to the present embodiment allows the operator or user to easily check the quality of the printed matter that is used for the illumination advertisement medium while considering the usage environment of the illumination advertisement medium.

A description is given below of a second embodiment of the present disclosure.

In the first embodiment of the present disclosure, the irradiation condition of illumination light is determined based on the attribute information of a print medium input by a user and the usage environment of an illumination advertisement medium. In the second embodiment of the present disclosure, the irradiation condition of illumination light is determined based on setting information stored in advance and selected by a user. The setting information is information associating the attribute information of a print medium and the usage environment of an illumination advertisement medium with the irradiation condition of the illumination light.

Specifically, the setting information according to the present embodiment is information associating the attribute information of the print medium and the usage environment of the illumination advertisement medium with the irradiation condition that has been used. For example, the irradiation condition that has been used is an irradiation condition recommended by a manufacturer of the illumination advertisement medium or the print medium.

Other examples of the irradiation condition that has been used include, but are not limited to, an irradiation condition used for a past printed matter delivered to the same client and an irradiation condition used as standard in the same type of business as the client.

The printing apparatus 100 according to the present embodiment performs printing with certain setting information. When the print quality is insufficient, the printing apparatus 100 can adjust the irradiation condition of the setting information. The printing apparatus 100 according to the present embodiment performs printing under an irradiation condition that is not registered as the setting information. When the print quality is sufficient, the printing apparatus 100 can store the irradiation condition as new setting information in association with the attribute information of the print medium and the usage environment of the illumination advertisement medium. Thus, the printing apparatus 100 according to the present embodiment optimizes the number of pieces of setting information that have been used and the accuracy of the setting information.

A description is given below of the printing system 1000 according to the present embodiment, with a focus on differences from the first embodiment.

<Functional Configuration of Printing System>

Figure 21:
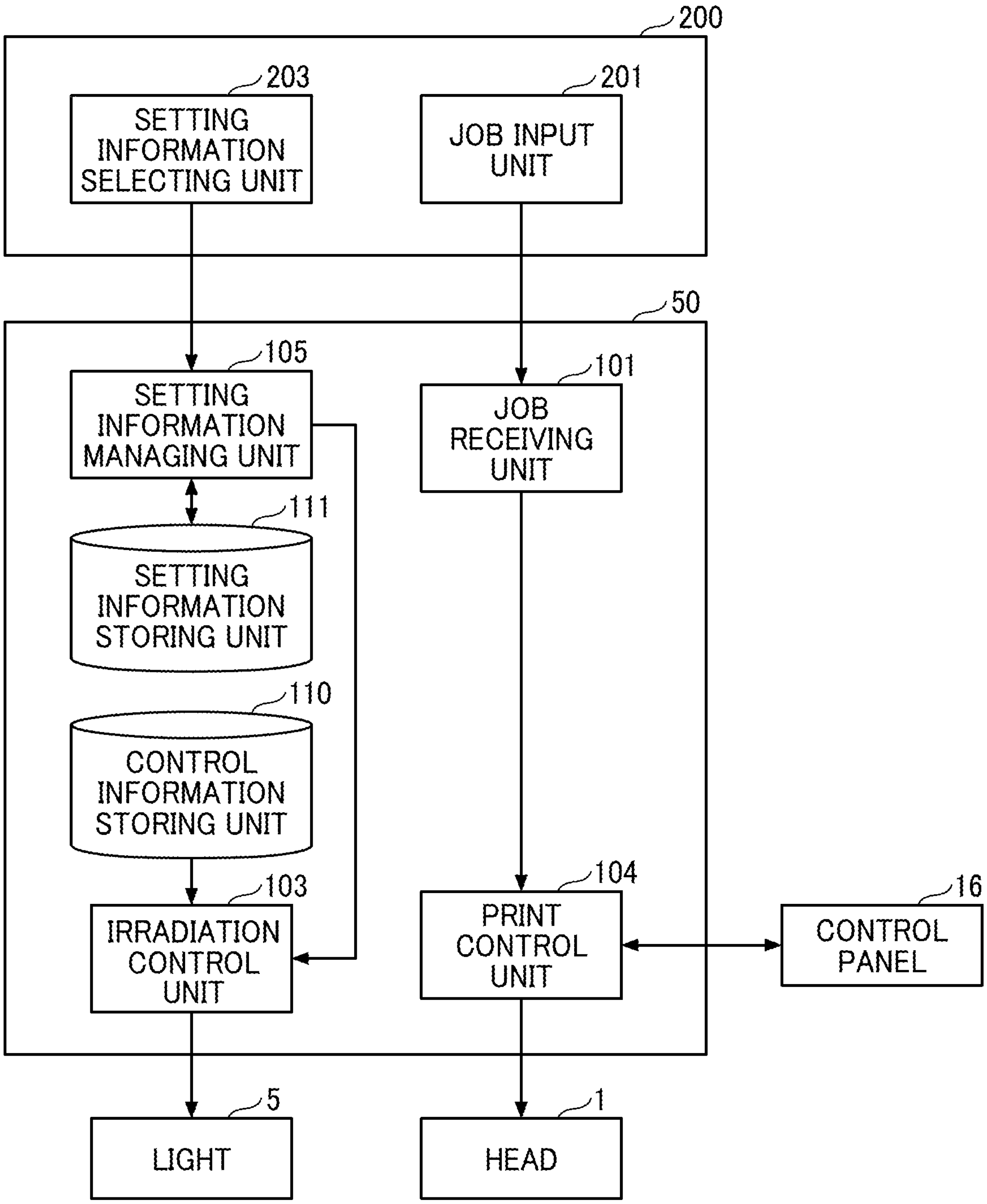
FIG. 21 is a block diagram illustrating a functional configuration of a printing system according to a second embodiment of the present disclosure.

Referring to FIG. 21, a description is given below of a functional configuration of the printing system 1000 according to the present embodiment.

FIG. 21 is a block diagram illustrating a functional configuration of the printing system 1000 according to the present embodiment.

<<Functional Configuration of Control Device>>

As illustrated in FIG. 21, the control device 50 according to the present embodiment includes the job receiving unit 101, the irradiation control unit 103, the print control unit 104, a setting information managing unit 105, the control information storing unit 110, and a setting information storing unit 111. In other words, the control device 50 according to the present embodiment is different from the control device 50 according to the first embodiment in that the control device 50 according to the present embodiment includes the setting information managing unit 105 instead of the usage information receiving unit 102 and further includes the setting information storing unit 111.

The setting information storing unit 111 stores the setting information associating the attribute information of a print medium and the usage environment of an illumination advertisement medium with the irradiation condition of illumination light. One or more pieces of setting information may be stored in advance in the setting information storing unit 111. For example, the setting information including the irradiation condition recommended by a manufacturer of the illumination advertisement medium or the print medium may be stored in advance.

The setting information managing unit 105 reads, from the setting information storing unit 111, the setting information selected by an operator. The setting information managing unit 105 stores the setting information in the setting information storing unit 111 in response to a request from an operator.

<<Functional Configuration of User Terminal>>

As illustrated in FIG. 21, the user terminal 200 according to the present embodiment includes the job input unit 201 and a setting information selecting unit 203. In other words, the user terminal 200 according to the present embodiment is different from the user terminal 200 according to the first embodiment in that the user terminal 200 according to the present embodiment includes the setting information selecting unit 203 instead of the usage information input unit 202.

The setting information selecting unit 203 receives the selection of the setting information in response to an operation by an operator. The setting information selecting unit 203 transmits the received setting information to the printing apparatus 100.

<Procedure for Executing Printing Method>

Figure 22:
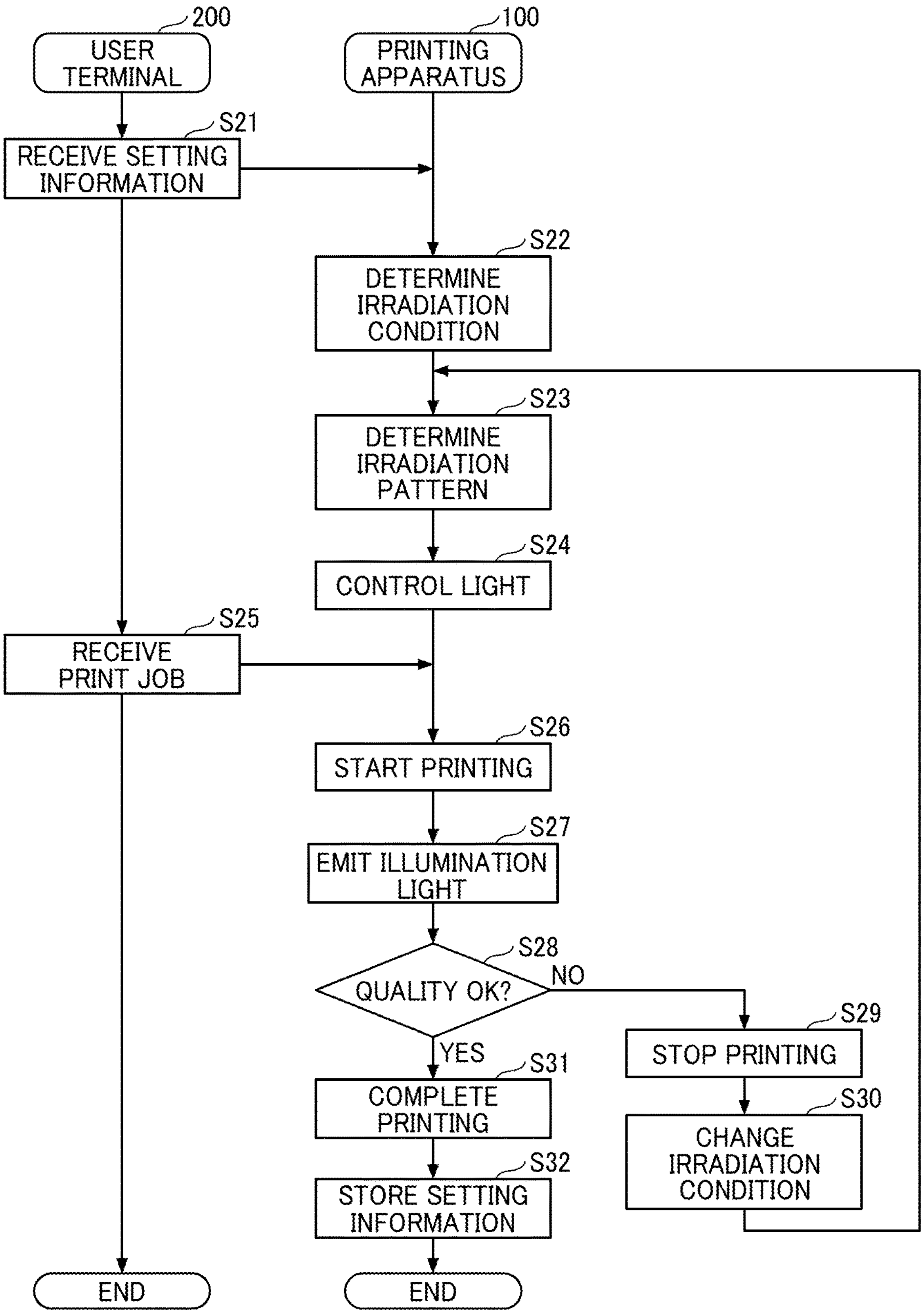
FIG. 22 is a flowchart of a procedure for executing a printing method according to the second embodiment of the present disclosure.
Figure 23:
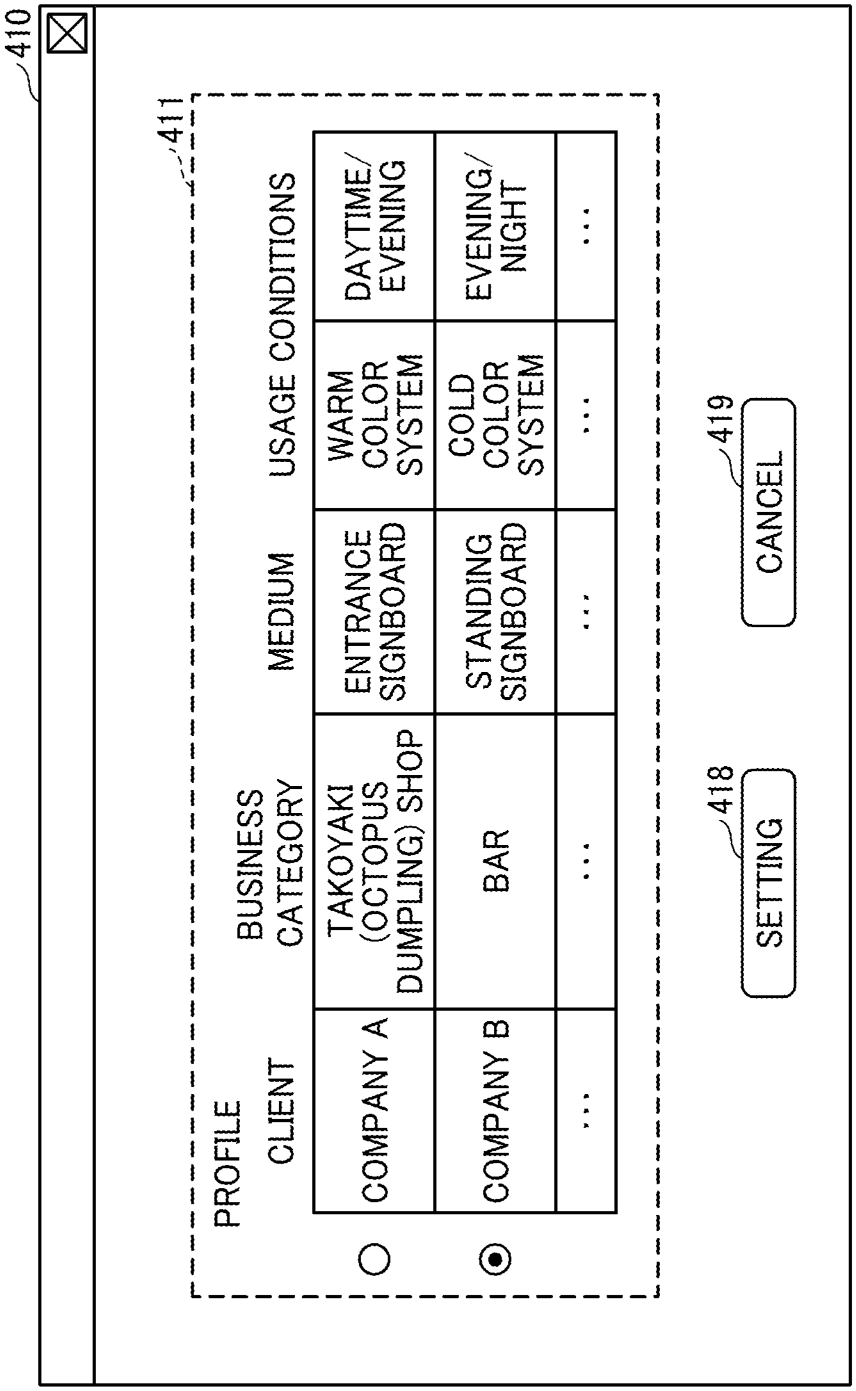
FIG. 23 is a diagram illustrating a setting screen according to the second embodiment of the present disclosure.

Referring to FIGS. 22 and 23, a description is given below of a procedure for executing a printing method according to the present embodiment.

FIG. 22 is a flowchart of a procedure for executing a printing method according to the present embodiment.

In step S21, the setting information selecting unit 203 of the user terminal 200 displays a setting screen on the display 506 in response to an operation by an operator of the printing apparatus 100. The setting screen according to the present embodiment is a setting screen through which the setting information is selected.

<<Setting Screen>>

Referring to FIG. 23, a description is given below of a setting screen according to the present embodiment.

FIG. 23 is a diagram illustrating a setting screen 410 according to the present embodiment.

As illustrated in FIG. 23, the setting screen 410 according to the present embodiment includes a profile selection field 411, a setting key 418, and a cancel key 419.

In the profile selection field 411, a list of setting information stored in the setting information storing unit 111 is selectively displayed. In the profile selection field 411 in the example illustrated in FIG. 23, the attribute information of the print medium and the usage environment of the illumination advertisement medium are set and displayed for each combination of the client and the business category, together with radio buttons that can be exclusively selected.

When the operator presses the setting key 418, the setting information selected in the profile selection field 411 is received. When the operator presses the cancel key 419, the setting information is not selected and the setting screen 410 is closed.

FIG. 23 illustrates, as an example, the setting information registered for each business category of the client. The printing apparatus 100 according to the present embodiment may register the setting information from any viewpoint. For example, the setting information may be registered for a specific client in units of seasons, time of day, or events.

Referring back to FIG. 22, in step S21, the setting information selecting unit 203 receives the setting information selected by the operator on the setting screen 410. The setting information selecting unit 203 then transmits the received setting information to the printing apparatus 100.

In step S22, the setting information managing unit 105 of the control device 50 receives the setting information from the user terminal 200. The setting information managing unit 105 then transmits the received setting information to the irradiation control unit 103. The irradiation control unit 103 receives the setting information from the setting information managing unit 105.

Based on the received setting information, the irradiation control unit 103 then determines the irradiation condition of the illumination light emitted from the light sources of the light 5.

First, the irradiation control unit 103 reads the setting information stored in the setting information storing unit 111. The irradiation control unit 103 then acquires the attribute information of the print medium and the usage environment of the illumination advertisement medium included in the setting information. Subsequently, the irradiation control unit 103 reads the control information stored in the control information storing unit 110, based on the acquired attribute information and usage environment. Then, the irradiation control unit 103 determines an irradiation condition based on the read control information.

The processing from step S23 to step S31 is substantially the same as the processing from step S3 to step S11 of the printing method according to the first embodiment (see FIG. 14).

In step S32, the setting information managing unit 105 of the control device 50 stores the setting information in the setting information storing unit 111 in response to a request from the operator. The setting information managing unit 105 includes the irradiation condition at the time of completion of printing in the setting information stored in the setting information storing unit 111. The irradiation condition at the time of completion of printing is the irradiation condition determined in step S22 or the irradiation condition changed in step S30.

Effects of Second Embodiment

The printing apparatus 100 according to the present embodiment stores the setting information associating the attribute information, the usage environment, and the irradiation condition, and emits illumination light based on the irradiation condition based on the attribute information and the usage environment associated in the selected setting information. The user can select, by a simple operation, the usage information that has been used or the usage information frequently used from the stored control information, which may be referred to as profile information. Thus, the printing apparatus 100 according to the present embodiment allows an operator or user to accurately and efficiently check the quality of the printed matter that is used for the illumination advertisement medium, based on proven usage information.

A description is given below of a first modification of the embodiments described above.

The light 5 according to the embodiments described above includes the plurality of light sources 5*a* to 5*j* that can be turned on and off independently from each other. On the other hand, as the print medium M that is used for an illumination advertisement medium, a print medium having a different width in the direction orthogonal to the conveyance direction can be selected to suit the use for the print medium.

For example, as the print medium M that is used for an illumination advertisement medium, a 54-inch print medium having a width of 54 inches or a 56-inch print medium having a width of 56 inches is often used. If the width of the light sources of the light 5 is set for the 56-inch print medium M, the illumination light enters the field of view of an operator from opposed sides of the print medium M when the 54-inch print medium M is used. As a result, the operator may have some difficulties in checking the print quality. By contrast, if the width of the light sources of the light 5 is set for the 54-inch print medium M, the opposed sides of the print medium M may be insufficiently irradiated with the illumination light when the 56-inch print medium M is used. As a result, the operator may fail to correctly check the print quality.

The printing apparatus 100 according to the present modification controls the position of a light source of illumination light, the range of the light source, or both the position and range of the light source, based on the width of a print medium. The attribute information according to the present modification includes information indicating the width of the print medium. The irradiation condition according to the present modification includes information indicating the position of the light source that emits the illumination light, the range of the light source, or both the position and range of the light source. Accordingly, the printing apparatus 100 according to the present modification can irradiate, with the illumination light, the printed print medium in a range appropriate for the width of the print medium.

The present modification may be applied when the print quality is checked in consideration of the position of the light source and the range of the light source in an illumination advertisement medium that uses a print medium. For example, some store signboards for restaurants may include light sources in a relatively narrow range around the center of the signboards to remind people of a lantern or an Andon Lamp, which is paper-covered wooden stand housing an (oil) lamp. To check the print quality of a printed matter that is used for such a store signboard, the illumination light may be set to emit a low amount of light from one or more light sources having a narrow width around the center of the light 5.

Effects of First Modification

The printing apparatus 100 according to the present modification controls the position of a light source of illumination light or the range of the light source, based on the size of a print medium or the size of the light source of an illumination signboard.

Accordingly, the printing apparatus 100 according to the present modification prevents the illumination light from entering the field of view of an operator from opposed sides of the print medium so that the operator is not dazzled and can accurately and efficiently check the quality of a printed matter that is used for an illumination advertisement medium, in consideration of the size the printed matter.

A description is given below of some aspects of the present disclosure.

According to a first aspect, a printing apparatus includes a print execution device including a plurality of heads to print an image on a print medium based on print data and an illumination device that irradiates the printed image on the print medium with illumination light from behind a printed face of the print medium.

According to a second aspect, in the printing apparatus of the first aspect, the illumination device is disposed behind the print medium when viewed from front of the printing apparatus.

According to a third aspect, the printing apparatus of the first aspect further includes an irradiation control unit that determines an irradiation condition of the illumination light based on attribute information of the print medium. The illumination device emits the illumination light based on the irradiation condition.

According to a fourth aspect, in the printing apparatus of the third aspect, the irradiation condition includes at least one of a color temperature of the illumination light or an amount of the illumination light.

According to a fifth aspect, in the printing apparatus of the third or fourth aspect, the attribute information is information indicating transparency of the print medium.

According to a sixth aspect, the printing apparatus of any one of the third to fifth aspect further includes a usage information receiving unit that receives an input of a usage environment of the print medium. The irradiation control unit determines the irradiation condition based on the attribute information and the usage environment.

According to a seventh aspect, in the printing apparatus of the sixth aspect, the usage environment includes a plurality of usage conditions. The irradiation control unit determines the irradiation condition for each of the plurality of usage conditions.

According to an eighth aspect, in the printing apparatus of the seventh aspect, the irradiation control unit switches the irradiation conditions at given time intervals.

According to a ninth aspect, the printing apparatus of any one of the sixth to eighth aspects further includes a setting information managing unit that writes, in a storing unit, setting information associating the attribute information, the usage environment, and the irradiation condition, and reads, from the storing unit, the attribute information and the usage environment associated in the setting information designated by a user.

According to a tenth aspect, in the printing apparatus of the third aspect, the attribute information is information indicating a width of the print medium in a direction orthogonal to a conveyance direction in which the print medium is conveyed.

According to an eleventh aspect, in the printing apparatus of the tenth aspect, the irradiation condition includes at least one of a position of a light source of the illumination light or a range of the light source.

According to a twelfth aspect, in the printing apparatus of the eleventh aspect, the light source has a range narrower than the width of the print medium.

According to a thirteenth aspect, a printing system includes a printing apparatus and a user terminal operable by a user and communicably connected to the printing apparatus through a network. The user terminal includes a job input unit that transmits a print job to the printing apparatus. The print job includes print data of an image to be printed by the printing apparatus. The printing apparatus includes a print execution device including a plurality of heads to print the image on a print medium based on the print data and an illumination device that irradiates the printed image on the print medium with illumination light from behind a printed face of the print medium.

According to a fourteenth aspect, a printing method performed by a printing apparatus includes printing an image on a print medium based on print data and irradiating the printed image on the print medium with illumination light from behind a printed face of the print medium.

According to a fifteenth aspect, in the printing method of the fourteenth aspect, the irradiating includes emitting the illumination light from an illumination device disposed behind the print medium when viewed from front of the printing apparatus.

According to a sixteenth aspect, the printing method of the fourteenth aspect further includes determining an irradiation condition of the illumination light based on attribute information of the print medium. The irradiating includes emitting the illumination light based on the irradiation condition.

According to a seventeenth aspect, in the printing method of the sixteenth aspect, the irradiation condition includes at least one of a color temperature of the illumination light or an amount of the illumination light.

According to an eighteenth aspect, in the printing method of the sixteenth or seventeenth aspect, the attribute information is information indicating transparency of the print medium.

According to a nineteenth aspect, the printing method of any one of the sixteenth to eighteenth aspects further includes receiving an input of a usage environment of the print medium. The determining includes determining the irradiation condition based on the attribute information and the usage environment.

According to a twentieth aspect, in the printing method of the nineteenth aspect, the usage environment includes a plurality of usage conditions. The determining includes determining the irradiation condition for each of the plurality of usage conditions.

According to a twenty-first aspect, in the printing method of the twentieth aspect, the determining includes switching the irradiation conditions at given time intervals.

According to a twenty-second aspect, the printing method of any one of the nineteenth to twenty-first aspects further includes writing, in a storing unit, setting information associating the attribute information, the usage environment, and the irradiation condition, and reading, from the storing unit, the attribute information and the usage environment associated in the setting information designated by a user.

According to a twenty-third aspect, in the printing method of the sixteenth aspect, the attribute information is information indicating a width of the print medium in a direction orthogonal to a conveyance direction in which the print medium is conveyed.

According to a twenty-fourth aspect, in the printing method of the twenty-third aspect, the irradiation condition includes at least one of a position of a light source of the illumination light or a range of the light source.

According to a twenty-fifth aspect, in the printing method of the twenty-fourth aspect, the light source has a range narrower than the width of the print medium.

According to a twenty-sixth aspect, a non-transitory recording medium stores a plurality of instructions which, when executed by one or more processors of a printing apparatus, causes the one or more processors to perform a printing method. The method includes determining an irradiation condition of illumination light based on attribute information of a print medium, printing an image on the print medium based on print data, and irradiating the printed image on the print medium with the illumination light from behind a printed face of the print medium, based on the determined irradiation condition.

According to the embodiments described above, the heads 1, the first moving assembly 2, and the second moving assembly 4 collectively serve as a print execution device. The light 5 serves an illumination device.

According to an embodiment of the present disclosure, the efficiency of checking the quality of a printed matter is enhanced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A printing apparatus comprising:

a print execution device including a plurality of heads to print an image on a print medium based on print data;

an illumination device, positioned outside of the printing apparatus, to irradiate the printed image on the print medium with illumination light from behind a printed face of the print medium;

a sheet ejection guide, wherein the illumination light is emitted from behind the printed face onto the printed surface of the print medium ejected by the sheet ejection guide from the printing apparatus; and circuitry configured to determine an irradiation condition, which includes at least one of a position of a light source of the illumination light or a range of the light source of the illumination light, based on attribute information of the print medium, wherein the attribute information is information indicating a width of the print medium in a direction orthogonal to a conveyance direction in which the print medium is conveyed, wherein the illumination device emits the illumination light based on the irradiation condition, and wherein the irradiation condition includes a color temperature of the illumination light.

2. The printing apparatus according to claim 1, wherein the illumination device is disposed behind the print medium when viewed from an operator of the printing apparatus who is standing in front of the printing apparatus.

3. A printing apparatus comprising:

a print execution device including a plurality of heads to print an image on a print medium based on print data;

an illumination device, positioned outside of the printing apparatus, to irradiate the printed image on the print medium with illumination light from behind a printed face of the print medium;

a sheet ejection guide, wherein the illumination light is emitted from behind the printed face onto the printed surface of the print medium ejected by the sheet ejection guide from the printing apparatus; and circuitry configured to determine an irradiation condition, which includes at least one of a position of a light source of the illumination light or a range of the light source of the illumination light, based on attribute information of the print medium, wherein the attribute information is information indicating a width of the print medium in a direction orthogonal to a conveyance direction in which the print medium is conveyed, wherein the illumination device emits the illumination light based on the irradiation condition, wherein the attribute information is information indicating transparency of the print medium.

4. A printing apparatus comprising:

a print execution device including a plurality of heads to print an image on a print medium based on print data;

an illumination device, positioned outside of the printing apparatus, to irradiate the printed image on the print medium with illumination light from behind a printed face of the print medium;

a sheet ejection guide, wherein the illumination light is emitted from behind the printed face onto the printed surface of the print medium ejected by the sheet ejection guide from the printing apparatus; and circuitry configured to determine an irradiation condition, which includes at least one of a position of a light source of the illumination light or a range of the light source of the illumination light, based on attribute information of the print medium, wherein the attribute information is information indicating a width of the print medium in a direction orthogonal to a conveyance direction in which the print medium is conveyed, wherein the illumination device emits the illumination light based on the irradiation condition, wherein the circuitry is configured to:

receive an input of a usage environment of the print medium; and determine the irradiation condition based on the attribute information and the usage environment.

5. The printing apparatus according to claim 4, wherein the usage environment includes a plurality of usage conditions, and wherein the circuitry is configured to determine the irradiation condition for each of the plurality of usage conditions.

6. The printing apparatus according to claim 5, wherein the circuitry is configured to switch a plurality of the irradiation conditions at given time intervals.

7. The printing apparatus according to claim 4, wherein the circuitry is configured to:

write, in a memory, setting information associating the attribute information, the usage environment, and the irradiation condition; and read, from the memory, the attribute information and the usage environment associated in the setting information designated by a user.

8. The printing apparatus according to claim 1, wherein the light source has a range narrower than the width of the print medium.

9. The printing apparatus according to claim 1, wherein the width of the print medium ejected from the printing apparatus is less than a width of the illumination light.

10. A non-transitory recording medium storing a plurality of instructions which, when executed by one or more processors of a printing apparatus, causes the one or more processors to perform a printing method, the method comprising:

determining an irradiation condition of illumination light based on attribute information of a print medium;

printing an image on the print medium based on print data; and irradiating the printed image by an illumination device on the print medium with the illumination light from behind a printed face of the print medium after the print medium being ejected by a sheet ejection guide from the printing apparatus, wherein the illumination device is positioned outside of the printing apparatus, based on the determined irradiation condition, wherein the irradiation condition includes at least one of a position of a light source of the illumination light or a range of the light source of the illumination light, and wherein the attribute information is information indicating a width of the print medium in a direction orthogonal to a conveyance direction in which the print medium is conveyed.

* * * * *